(12) United States Patent
Sumi

(10) Patent No.: US 9,087,500 B2
(45) Date of Patent: Jul. 21, 2015

(54) NOTE SEQUENCE ANALYSIS APPARATUS

(71) Applicant: Yamaha Corporation, Hamamatsu-shi, Shizuoka-ken (JP)

(72) Inventor: Kouhei Sumi, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 13/944,333

(22) Filed: Jul. 17, 2013

(65) Prior Publication Data

US 2014/0020546 A1   Jan. 23, 2014

(30) Foreign Application Priority Data

Jul. 18, 2012 (JP) .................................. 2012-159331
Jun. 5, 2013 (JP) .................................. 2013-118644

(51) Int. Cl.
| | | |
|---|---|---|
| A63H 5/00 | (2006.01) | |
| G04B 13/00 | (2006.01) | |
| G10H 7/00 | (2006.01) | |
| G10H 1/00 | (2006.01) | |
| G06F 17/30 | (2006.01) | |
| G09B 15/00 | (2006.01) | |

(52) U.S. Cl.
CPC ............ *G10H 7/00* (2013.01); *G06F 17/30743* (2013.01); *G09B 15/00* (2013.01); *G10H 1/0008* (2013.01); *G10H 2240/141* (2013.01)

(58) Field of Classification Search
CPC  G09B 15/00; G06F 17/30743; A01B 12/006; G10H 2240/141
USPC .......................................................... 84/609
See application file for complete search history.

(56) References Cited

U.S. PATENT DOCUMENTS 6,107,559 A * 8/2000 Weinstock et al. ............. 84/634
7,829,777 B2 * 11/2010 Kyuma et al. ............... 84/477 R
(Continued)

FOREIGN PATENT DOCUMENTS

| EP | 0 731 446 A1 | 9/1996 |
|---|---|---|
| JP | 1-309087 | 12/1989 |
| JP | 7-36478 | 2/1995 |
| JP | 3915452 B2 | 5/2007 |
| WO | WO 01/69575 A1 | 9/2001 |

OTHER PUBLICATIONS

European Search Report dated Jul. 23, 2014 (Six (6) pages).
(Continued)

*Primary Examiner* — Jeffrey Donels
(74) *Attorney, Agent, or Firm* — Crowell & Moring LLP

(57) ABSTRACT

A note sequence analysis apparatus calculates a similarity index based on similarity between a designated sequence of notes designated by a user and a reference sequence of notes for each of a plurality of reference pieces of music, then selects a reference piece of music from among the plurality of reference pieces of music based on the similarity index calculated for each of the plurality of reference pieces of music, and specifies an evaluation index of the designated sequence of notes based on the similarity index calculated for the selected reference piece of music.

22 Claims, 14 Drawing Sheets

(56) References Cited

U.S. PATENT DOCUMENTS

| | | | |
|---|---|---|---|
| 8,283,548 B2* | 10/2012 | Oertl et al. ................. | 84/609 |
| 2001/0039870 A1 | 11/2001 | Shimaya et al. | |
| 2013/0192445 A1* | 8/2013 | Sumi et al. ................. | 84/609 |
| 2014/0230630 A1* | 8/2014 | Wieder ...................... | 84/609 |

OTHER PUBLICATIONS

Lemstroem, et al. "Including Interval Encoding into Edit Distance Based Music Comparison and Retrieval", Proc. AISB'2000, Symposium on Creative & Cultural Aspects and Applications of AI & Cognitive Science, Apr. 14, 2000, pp. 53-60, Birmingham, United Kingdom, (Eighteen (18) pages).

Japanese Office Action dated May 12, 2015 with English-language translation.

Marcel Mongeau et al., Comparison of Musical Sequences, Computers and the Humanities, Jun. 1990, pp. 161-175, vol. 24, Issue 3, Kluwer Academic Publishers.

* cited by examiner

FIG. 1
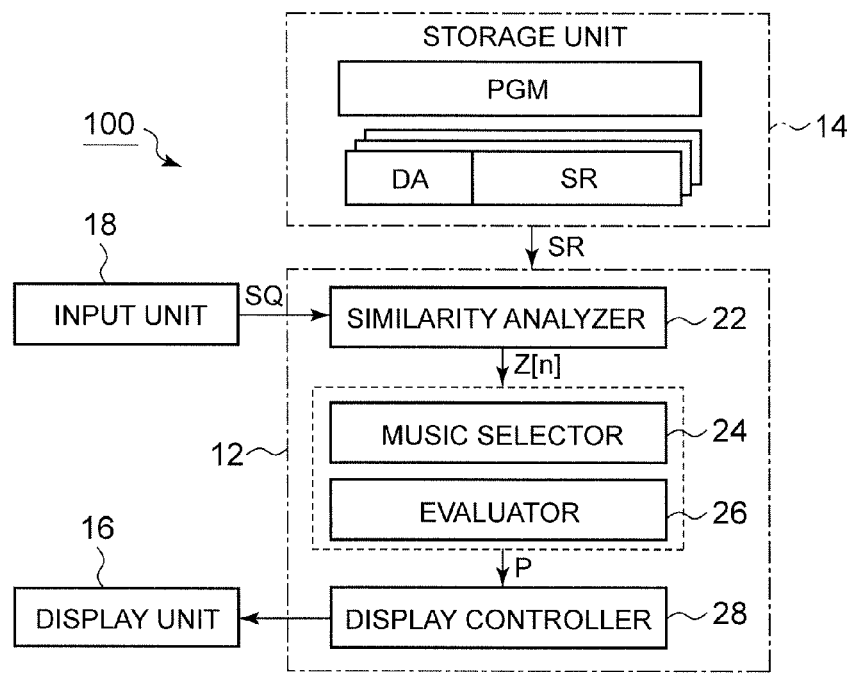
FIG. 2(A)
FIG. 2(B)
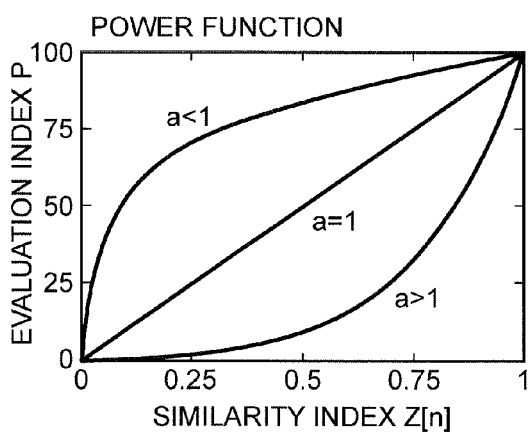
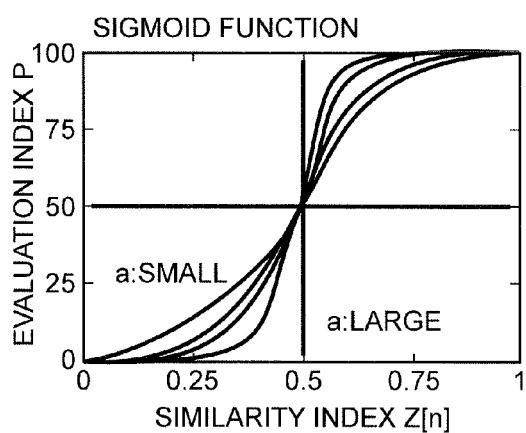

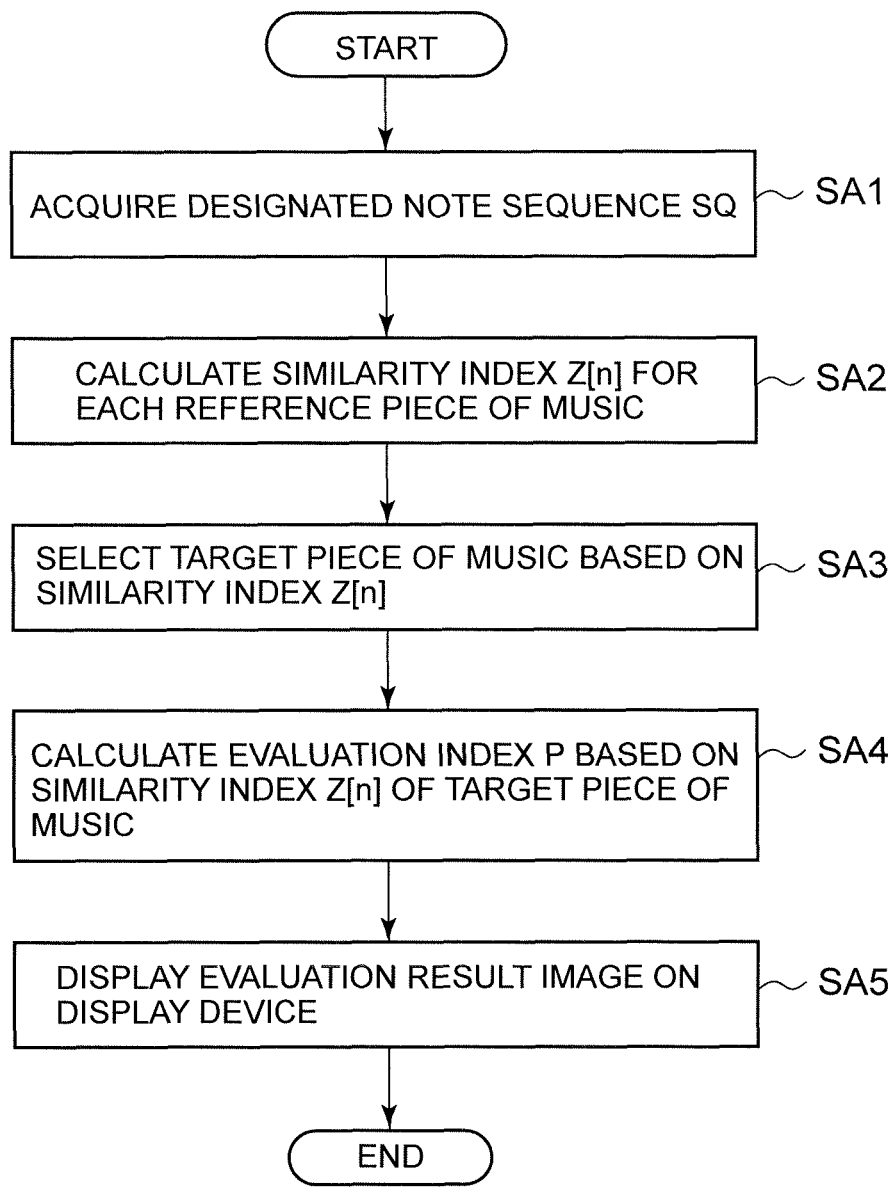

FIG. 7
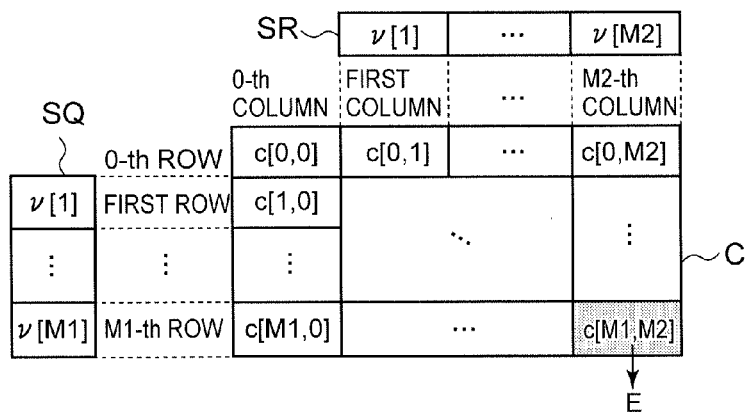
FIG. 8
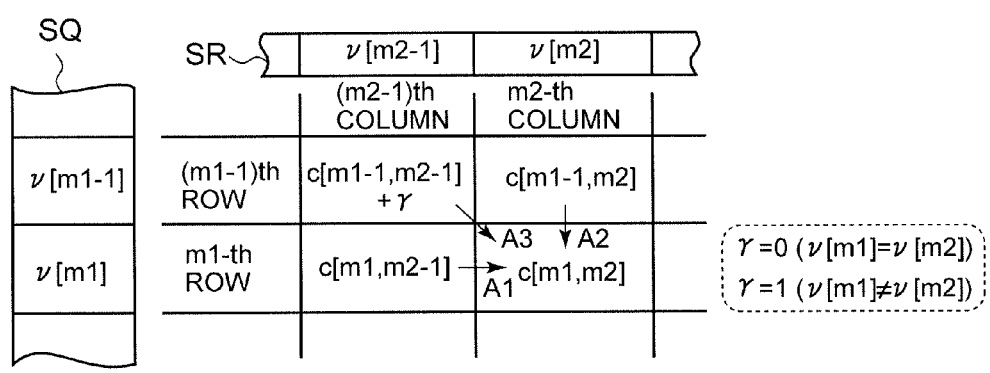
FIG. 9
| SR | | C | G | F | E | D | C | D | C |
|---|---|---|---|---|---|---|---|---|---|
| SQ | | 0 | 1 | 2 | 3 | 4 | 5 | 6 | 7 |
| C | 1 | 0 | 1 | 2 | 3 | 4 | 5 | 6 | 7 |
| E | 2 | 1 | 1 | 2 | 2 | 3 | 4 | 5 | 6 |
| G | 3 | 2 | 1 | 2 | 3 | 3 | 4 | 5 | 6 |
| D | 4 | 3 | 2 | 2 | 3 | 3 | 4 | 4 | 5 |
| F | 5 | 4 | 3 | 2 | 3 | 4 | 4 | 5 | 6 |
| C | 6 | 5 | 4 | 3 | 3 | 4 | 4 | 5 | 5 |
| E | 7 | 6 | 5 | 4 | 3 | 4 | 5 | 5 | 6 |

$\gamma = 0$ ($\nu$[m2]=$\nu$[m1-1] or $\nu$[m2]=$\nu$[m1] or $\nu$[m2]=$\nu$[m1+1])
$\gamma = 1$ (otherwise)

| SQ \ SR | | C | G | F | E | D | C | D | C |
|---|---|---|---|---|---|---|---|---|---|
| | | 0 | 1 | 2 | 3 | 4 | 5 | 6 | 7 | 8 |
| C | 1 | 0 | 1 | 2 | 3 | 4 | 5 | 6 | 7 |
| E | 2 | 1 | 0 | 1 | 2 | 3 | 4 | 5 | 6 |
| G | 3 | 2 | 1 | 1 | 1 | 2 | 3 | 4 | 5 |
| D | 4 | 3 | 2 | 1 | 2 | 1 | 2 | 3 | 4 |
| F | 5 | 4 | 3 | 2 | 2 | 2 | 1 | 2 | 3 |
| C | 6 | 5 | 4 | 3 | 2 | 3 | 2 | 2 | 2 |
| E | 7 | 6 | 5 | 4 | 3 | 3 | 3 | 3 | 2 |

$\gamma = 0$ ($\nu[m1]=\nu[m2-1]$ or $\nu[m1]=\nu[m2]$ or $\nu[m1]=\nu[m2+1]$)
$\gamma = 1$ (otherwise)

| SR | | C | G | F | E | D | C | D | C |
|---|---|---|---|---|---|---|---|---|---|
| SQ | 0 | 1 | 2 | 3 | 4 | 5 | 6 | 7 | 8 |
| C | 1 | 0 | 1 | 2 | 3 | 4 | 5 | 6 | 7 |
| E | 2 | 1 | 1 | 1 | 2 | 3 | 4 | 5 | 6 |
| G | 3 | 2 | 1 | 1 | 2 | 3 | 4 | 5 | 6 |
| D | 4 | 3 | 2 | 2 | 1 | 2 | 3 | 4 | 5 |
| F | 5 | 4 | 3 | 2 | 2 | 2 | 3 | 4 | 5 |
| C | 6 | 5 | 4 | 3 | 3 | 2 | 2 | 3 | 4 |
| E | 7 | 6 | 5 | 4 | 3 | 3 | 3 | 3 | 4 |

NOTE SEQUENCE ANALYSIS APPARATUS

BACKGROUND OF THE INVENTION

1. Technical Field of the Invention

The present invention relates to technology for analyzing a sequence of music notes designated by a user.

2. Description of the Related Art

A technology for evaluating instrument play of a user has been proposed. For example, Japanese Patent Publication No. 3915452 discloses a technology for evaluating instrument play of a user by comparing a note sequence of a piece of music selected by the user from a plurality of candidates of pieces of music with a note sequence of a piece of music played by the user using an electronic instrument.

According to the technology of Japanese Patent Publication No. 3915452, however, it is necessary for the user to designate a piece of music corresponding to a target for evaluation each time the user plays the instrument, which is a cumbersome process. Since the user needs to practice a lot to play the instrument well, it is very inconvenient for the user to designate a piece of music each time the user plays the instrument.

SUMMARY OF THE INVENTION

In view of this problem, an object of the present invention is to simplify operation of a user to designate a piece of music corresponding to an evaluation target.

Means employed by the present invention to achieve the object will be described. Although, in the following description, elements of the embodiments described later corresponding to elements of the invention are referenced in parentheses for better understanding, such parenthetical reference is not intended to limit the scope of the invention to the embodiments.

A note sequence analysis apparatus according to the present invention comprises one or more processors configured to: calculate a similarity index (e.g. a similarity index $Z[n]$) based on similarity between a designated sequence of notes designated by a user and a reference sequence of notes for each of a plurality of reference pieces of music (e.g. similarity analyzer 22); select a reference piece of music from among the plurality of reference pieces of music based on the similarity index calculated for each of the plurality of reference pieces of music (e.g. music selector 24); and specify an evaluation index (e.g. evaluation index P) of the designated sequence of notes based on the similarity index calculated for the selected reference piece of music (e.g. evaluator 26).

In this configuration, since the reference piece of music is selected based on the similarity index between the designated note sequence and the reference note sequence and the evaluation index of the designated piece of music is calculated from the similarity index, the user need not designate the reference piece of music corresponding to an evaluation target. Accordingly, it is possible to ease the user's burden of designation of a reference piece of music corresponding to an evaluation target.

In a preferred embodiment of the present invention, the similarity index is calculated based on an edit distance between the designated sequence of notes and the reference sequence of notes.

According to this configuration, it is possible to evaluate the similarity between the designated note sequence and the reference note sequence with respect to arrangement of a plurality of notes (note names or arrangement order) because the similarity index is calculated based on the edit distance between the designated note sequence and the reference note sequence.

In a preferred embodiment (e.g. second and third embodiments) of the invention, the edit distance is calculated by setting a substitution cost (e.g. substitution cost γ) between a first note (e.g. note ν[m1]) in the designated sequence of notes and a second note (e.g. note ν[m2]) in the reference sequence of notes to a first value (e.g. 0) when one of the first and second notes corresponds to any of a plurality of notes within a tolerance period (e.g. tolerance period α[m1] or tolerance period α[m2]) including the other of the first and second notes and by setting the substitution cost to a second value (e.g. 1) different from the first value when one of the first and second notes does not correspond to any of the plurality of notes in the tolerance period.

In this configuration, since the substitution cost between the first note and the second note is set based on differences between one of the first and second notes and the plurality of notes contained in the tolerance period including the other of the first and second notes, it is possible to analyze correlation (similarity) between the designated note sequence and the reference note sequence robustly against variation in the order of notes in the designated note sequence.

In a preferred embodiment (e.g. a fourth embodiment) of the configuration using the tolerance period, the similarity index is calculated based on an edit distance (e.g. edit distance EQ) when the tolerance period (e.g. tolerance period α[m1]) including the first note is set in the designated note sequence and an edit distance (e.g. edit distance ER) when the tolerance period (e.g. tolerance period α[m2]) including the second note is set in the reference note sequence.

According to this configuration, it is possible to evaluate the correlation between the designated note sequence and the reference note sequence with high accuracy by reducing influence of a difference between the edit distance calculated when the tolerance period is set in the designated note sequence and the edit distance calculated when the tolerance period is set in the reference note sequence, because the similarity index is calculated based on the edit distance when the tolerance period is set in the designated note sequence and the edit distance when the tolerance period is set in the reference note sequence.

In a preferred embodiment of the present invention, the similarity index is calculated based on a result of comparison between a duration feature (e.g. duration features T) of the designated sequence of notes for each unit period thereof and a duration feature of the reference sequence of notes for each unit period thereof, the duration feature being obtained by arranging a plurality of element values corresponding to a plurality of pitch classes within the unit period, each element value corresponding to a sum of durations of notes belonging to each pitch class.

In this configuration, since the similarity index is computed based on the result of comparison of the duration features between each unit period of the designated note sequence and each unit period of the reference note sequence, the similarity between the designated note sequence and the reference note sequence can be evaluated from a harmonic perspective.

In a preferred embodiment of the present invention, the similarity index is calculated based on a result of comparison of a time value feature (e.g. time value features H) of the designated sequence of notes for each unit period thereof and a time value feature of the reference sequence of notes for each unit period thereof, the time value feature being obtained by arranging a plurality of element values corresponding to a plurality of time values within the unit period, each element value corresponding to a number of notes belonging to each time value.

In this configuration, since the similarity index is computed based on the result of comparison of time value features between the designated note sequence and the reference note sequence, the similarity between the designated note sequence and the reference note sequence can be evaluated from the viewpoint of the number of notes corresponding to each time value.

In a preferred example of each of the above-described embodiments, the similarity index is calculated based on similarity between an entire length of the reference sequence of notes and an entire length of the designated sequence of notes. In this configuration, the evaluation index is set to a value representing a highly evaluated state when an interval of the reference note sequence, which correctly corresponds to the designated note sequence, is long since the similarity value is calculated based on similarity between the whole reference note sequence and the whole designated note sequence.

In another embodiment of the invention, the processor is configured to: calculate a basic value (e.g. basic value x[b] and basic value y[b]) based on similarity between the designated sequence of notes and the reference sequence of notes for each of a plurality of cases in which a position of the designated sequence of notes is changed in a time domain relative to the reference sequence of notes; and calculate the similarity index based on a plurality of the basic values calculated for the plurality of the cases. In this configuration, the evaluation index is set to a value representing a highly evaluated state even when only a specific interval of the reference note sequence corresponds to the designated note sequence.

According to a configuration in which the processor is configured to correct the similarity index of the selected reference piece of music based on a ratio between a length of the designated sequence of notes and a length of the reference sequence of notes of the selected reference piece of music, the similarity index of the selected reference piece of music is corrected based on the ratio of a note sequence length of the reference note sequence of the reference piece of music to a note sequence length of the designated note sequence, it is possible to set the evaluation index to a value representing a highly evaluated state when an interval of the reference note sequence, which correctly corresponds to the designated note sequence, is long.

In a preferred embodiment of the present invention, the processor is configured to: successively perform, each time a designated sequence of notes is inputted by the user, a routine of calculating the similarity index, selecting the reference piece of music and specifying the evaluation index, thereby generating a time series of the evaluation indices for the designated sequences of notes; and control a display device to display an evaluation transition image (e.g. evaluation transition image 312) representing the time series of the evaluation indices corresponding to the designated sequences of notes (e.g. display controller 28).

According to this configuration, the user can visually recognize temporal variation of their performance of the reference piece of music since the evaluation transition image representing the time series of the evaluation indices of the designated note sequences is displayed on the display device. The music selection means may be omitted from the configuration including the display control means.

In a preferred example of the embodiment, the processor is configured to control a display device to display warning that the designated sequence of notes is not similar to any of reference sequences of notes when the similarity index calculated for each reference piece of music fails to clear a threshold value.

According to this configuration, the user can recognize that the designated note sequence played by the user is not similar to any of reference pieces of music (e.g. a reference piece of music corresponding to the designated note sequence is not prepared). The expression "fails to clear a threshold" means that the similarity index is less than the threshold value when the similarity index increases as the designated note sequence and the reference note sequence become similar to each other, and that the similarity index exceeds the threshold value when the similarity index decreases as the designated note sequence and the reference note sequence become similar to each other.

In a preferred embodiment of the present invention, the processor is configured to: select two or more of reference pieces of music based on the similarity index calculated for each of the plurality of reference pieces of music; and select one reference piece of music from among the selected two or more of reference pieces of music according to instruction of the user.

According to this configuration, the user can select the target reference piece of music from among the two or more of candidate reference pieces of music pre-selected according to the similarity indices. Therefore, this configuration can reduce possibility of selecting a target piece of music which is not intended by the user as compared to another configuration in which a reference piece of music having a maximal similarity index is automatically selected as a target reference piece of music.

The note sequence analysis apparatus according to each of the embodiments of the invention may not only be implemented by hardware (electronic circuitry) dedicated for music analysis, such as a digital signal processor (DSP), but may also be implemented through cooperation of a general operation processing device such as a central processing unit (CPU) with a program. A program according to an aspect of the invention executes, on a computer, a similarity analysis process for calculating a similarity index based on similarity between a designated note sequence designated by a user and a reference note sequence for each reference piece of music, a music selection process for selecting a reference piece of music based on the similarity index calculated by the similarity analysis process, and an evaluation process for specifying an evaluation index based on the similarity index calculated by the similarity analysis process for the reference piece of music selected by the music selection process.

According to this program, the same operation and effect as those of the note sequence analysis apparatus according to the invention can be achieved. The program according to the present invention can be stored in a computer readable non-transitory recording medium and installed in a computer, or distributed through a communication network and installed on a computer.

The present invention is also specified as a note sequence analysis method comprising the steps of: calculating a similarity index (for example, similarity index $Z[n]$) based on similarity between a designated sequence of notes designated by a user and a reference sequence of notes for each of a plurality of reference pieces of music; selecting a reference piece of music from among the plurality of reference pieces of music based on the similarity index calculated for each of the plurality of reference pieces of music; and specifying an evaluation index (for example, evaluation index P) of the designated sequence of notes based on the similarity index calculated for the selected reference piece of music. The note sequence analysis method according to the invention can achieve the same performance and the same effect as the note sequence analysis apparatus according to the invention.

BRIEF DESCRIPTION OF THE DRAWINGS

FIG. 1 is a block diagram of a note sequence analysis apparatus according to a first embodiment of the invention.

FIGS. 2(A) and 2(B) are graphs showing the relationship between a similarity index and an evaluation index.

FIG. 3 is a flowchart showing operation of the note sequence analysis apparatus according to the first embodiment.

FIG. 7 illustrates a distance matrix.

FIG. 8 illustrates each distance in a distance matrix.

FIG. 9 illustrates an exemplary distance matrix in detail.

DETAILED DESCRIPTION OF THE INVENTION

First Embodiment

Figure 4:
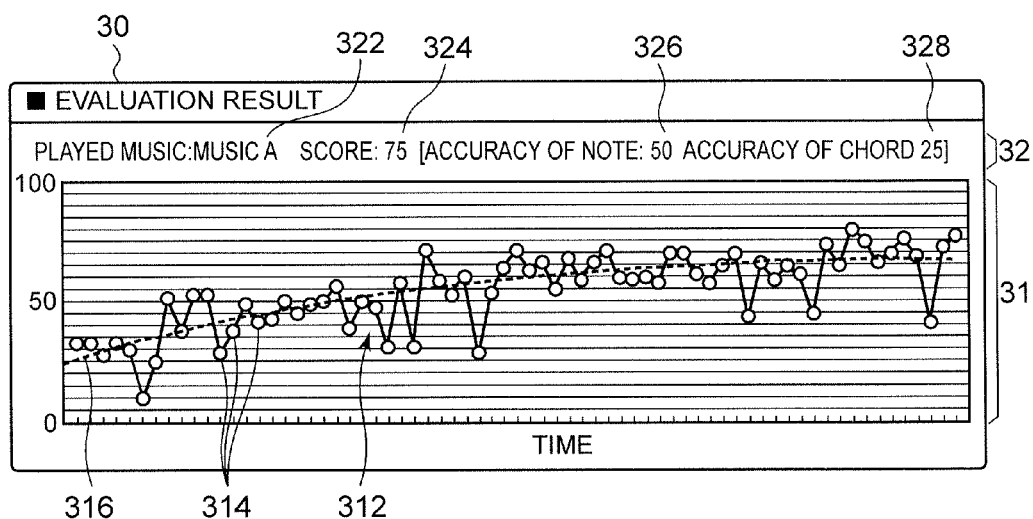
FIG. 4 shows an evaluation result image.

FIG. 1 is a block diagram of a note sequence analysis apparatus 100 according to a first embodiment of the present invention. The note sequence analysis apparatus 100 according to the first embodiment of the invention is a signal processing apparatus that evaluates a musical correlation between a sequence of a plurality of notes designated by a user (referred to as "designated note sequence" hereinafter) and a sequence of a plurality of notes constituting a previously prepared reference piece of music (referred to as "reference note sequence" hereinafter), and is used as a performance evaluation apparatus for evaluating the performance of a piece of music by the user. As shown in FIG. 1, the note sequence analysis apparatus 100 is implemented as a computer system including a processing unit 12, a storage unit 14, a display unit 16, and an input unit 18.

The storage unit 14 stores a program PGM executed by the processing unit 12 and information used by the processing unit 12. A known storage medium such as a semiconductor storage medium, a magnetic storage medium or the like, or a combination of storage media of a plurality of types can be used as the storage unit 14.

The storage unit 14 according to the first embodiment stores attribute information DA and reference note sequences SR respectively corresponding to N (N being a natural number greater than 2) number of different reference pieces of music. The attribute information DA designates an identification code (for example, a music title) of a reference piece of music, a tempo of the reference piece of music, etc. Each reference note sequence SR designates a time series of notes constituting at least part of the corresponding reference piece of music. For example, time-series data in MIDI format, in which event data that designates the pitch of each note of a reference piece of music and instructs sound generation/sound suppression and timing data that designates an event data processing time are arranged in a time series, is described as the reference note sequence SR.

The display unit 16 (for example, a liquid crystal display panel) displays an analysis result obtained by the processing unit 12. The input unit 18 receives an instruction from a user. Specifically, the user designates a plurality of notes constituting the designated note sequence SQ through the input unit 18. For example, an electronic instrument such as a MIDI instrument is preferably used as the input unit 18. Accordingly, the designated note sequence SQ is described as time-series data in MIDI format, like the reference note sequence SR. A subscript R (reference) may be attached to a reference symbol of a component related to the reference note sequence SR and a subscript Q (query) may be attached to a reference symbol of a component related to the designated note sequence SQ, like representation of the reference note sequence SR and the designated note sequence SQ.

The processing unit 12 implements a plurality of functions (functions of a similarity analyzer 22, a music selector 24, an evaluator 26 and a display controller 28) for analyzing a correlation (similarity or a degree of difference) between the designated note sequence SQ and reference note sequence SR of each of N reference pieces of music and presenting the analysis result to the user by executing the program PGM stored in the storage unit 14. It is possible to employ a configuration in which the functions of the processing unit 12 are distributed across a plurality of integrated circuits or a configuration in which a dedicated electronic circuit (digital signal processor (DSP)) implements some functions.

The similarity analyzer 22 calculates a similarity index $Z[n]$ ($Z[1]$ to $Z[N]$) (n being in the range of 1 to N) for each of the N reference pieces of music based on similarity (distance or correlation) between the designated note sequence SQ and the reference note sequence SR. The similarity analyzer 22 according to the first embodiment calculates each similarity index $Z[n]$ in the range of 0 to 1 such that the similarity index $Z[n]$ can increase as the designated note sequence SQ and the reference note sequence SR become musically similar to each other.

The music selector 24 selects a reference piece of music (referred to as "target piece of music" hereinafter) from the N reference pieces of music based on the similarity index $Z[n]$ calculated by the similarity analyzer 22 for each reference piece of music. Specifically, the music selector 24 selects (retrieves) a reference piece of music corresponding to a maximum similarity index $Z[n]$ from the N reference pieces of music as the target piece of music. Since the similarity index $Z[n]$ corresponding to a reference piece of music performed by the user, from among the N reference pieces of music, tends to increase, the music selector 24 functions as an element for searching and estimating a reference piece of music performed by the user on the basis of the similarity index Z[n].

The evaluator 26 designates an evaluation index P based on the similarity index Z[n] (i.e. a maximum value from among N similarity indices Z[1] to Z[n]) calculated by the similarity analyzer 22 for the target piece of music selected by the music selector 24. The evaluation index P is a numerical value (score) used as an indicator of input play (i.e. performance of the target piece of music) of the designated note sequence SQ by the user. The evaluator 26 according to the first embodiment converts (maps) the similarity index Z[n] of the target piece of music to the evaluation index P in a predetermined range (of 0 to 1) according to Equations (1A) or (1B).

$$P = 100 \cdot Z[n]^a \quad (1A)$$

$$P = 100 \cdot \frac{1}{1 + e^{-aZ[n]}} \quad (1B)$$

Equation (1A) is a power function having the coefficient a as an exponent and variably defines the relationship between the similarity index Z[n] and the evaluation index P based on the coefficient a, as shown in FIG. 2(A). Equation (1B) is a Sigmoid function having the coefficient a as a gain and variably defines the relationship between the similarity index Z[n] and the evaluation index P based on the coefficient a, as shown in FIG. 2(B). In Equations (1A) and (1B), the coefficient a is variably set. For example, the coefficient a may be controlled according to an instruction of the user, input through the input unit 18. Otherwise, the coefficient a may be controlled based on the duration of a reference piece of music.

As described above, since the reference piece of music (target piece of music) corresponding to an evaluation target is selected from the N reference pieces of music based on the similarity index Z[n] between the designated note sequence SQ and the reference note sequence SR in the first embodiment, a process through which the user designates the reference piece of music by manipulating the input unit 18 is not needed. Accordingly, it is possible to ease the user's burden of designation of the reference piece of music corresponding to the evaluation target.

The user repeats the performance of a desired reference piece of music (input play of the designated note sequence SQ). Computation of the similarity index Z[n] corresponding to each reference piece of music according to the similarity analyzer 22, selection of a reference piece of music according to the music selector 24 and specifying of the evaluation index P according to the evaluator 26 are sequentially performed every time the user inputs the designated note sequence SQ by playing thereof. That is, the evaluation index P is calculated for each of a plurality of designated note sequences SQ. The display controller 28 shown in FIG. 1 displays an image (referred to as "evaluation result image" hereinafter) for presenting an evaluation result with respect to each designated note sequence SQ to the user on the display unit 16.

FIG. 3 is a flowchart showing operation of the note sequence analysis apparatus 100 (processing unit 12). The process of FIG. 3 is commenced, for example, when the user instructs start of evaluation of performance of a musical instrument. When a designated note sequence SQ is acquired in response to operation on the input unit 18 (SA1), the processing unit 12 (similarity analyzer 22) calculates a similarity index Z[n] based on similarity between the designated note sequence SQ and a reference note sequence SR for each of a plurality of reference pieces of music (SA2). The processing unit 12 functions as the music selector 24 to select a reference piece of music as a target piece of music from among the plurality of reference pieces of music based on the similarity index Z[n] calculated for each of the plurality of reference pieces of music (SA3), and further functions as the evaluator 26 to specify an evaluation index P of the designated sequence of notes based on the similarity index Z[n] (SA4). Then, the processing unit 12 (display controller 28) displays an evaluation result image 30 on the display unit 16 as exemplified below (SA5).

FIG. 4 shows the evaluation result image 30 according to the first embodiment of the invention. The evaluation result image 30 includes a first area 31 and a second area 32. A graph (referred to as "evaluation transition image" hereinafter) 312 representing temporal variation of the evaluation index P (vertical axis) is displayed in the first area 31. The evaluation transition image 312 is a polyline generated by connecting figures (referred to as "evaluation indicators" hereinafter) 314 arranged on coordinates formed by points of time (performances) corresponding to designated note sequences SQ on the time axis (horizontal axis) and points of evaluation indices P (vertical axis) respectively calculated for the designated note sequences SQ. An evaluation approximation line 316 approximating temporal transition of each evaluation index P is displayed along with the evaluation transition image 312 in the first area 31. A known approximation process such as polynomial approximation, logarithmic approximation, exponential approximation or the like may be employed to generate the evaluation approximation line 316.

Since temporal transition (evaluation transition image 312 and evaluation approximation line 316) of the evaluation index P is diagrammatically displayed on the display unit 16 as described above, the user can recognize temporal variation of the performance of a reference piece of music visually and intuitively. Furthermore, the user can easily be aware that the performance skill of the target piece of music is improving based upon the evaluation transition image 312, and thus the user can be encouraged to practice the target piece of music.

The second area 32 of the evaluation result image 30 displays an identification code (music title) 322 represented by the attribute information DA of the reference piece of music selected by the music selector 24 and a numerical value 324 of the evaluation index P corresponding to one of a plurality of designated note sequences SQ inputted by the user in the past. Specifically, the display controller 28 displays, in the second area 32, a numerical value 324 of an evaluation index P corresponding to the first designated note sequence SQ from among designated note sequences SQ of the past and, when the user selects a desired evaluation indicator 314 by manipulating the input unit 18, displays, in the second area 32, a numerical value 324 of an evaluation index P of a designated note sequence SQ corresponding to the evaluation indicator 314. That is, the user can confirm the numerical value 324 of the evaluation index P of the designated note sequence SQ of the past.

<Similarity Analyzer 22>

Figure 5:
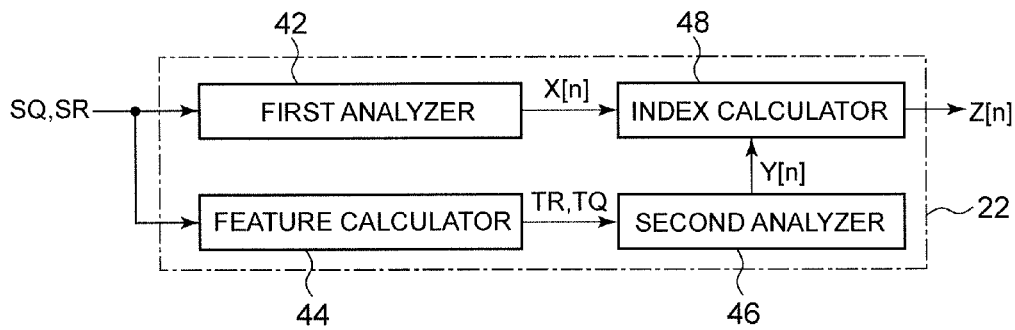
FIG. 5 is a block diagram of a similarity analyzer.

The detailed configuration and operation of the similarity analyzer 22 of FIG. 1 will now be described. The similarity analyzer 22 according to the first embodiment includes a first analyzer 42, a feature calculator 44, a second analyzer 46 and an index calculator 48, as shown in FIG. 5. The first analyzer 42 calculates a similarity index X[n] (X[1] to X[N]) based on an edit distance (Levenshtein distance) between a designated note sequence SQ and a reference note sequence SR for each reference piece of music. That is, the similarity index $X[n]$ is an indicator for evaluating similarity between the designated note sequence SQ and the reference note sequence SR from the viewpoint of arrangement of a plurality of notes (note names and arrangement order).

Figure 6:
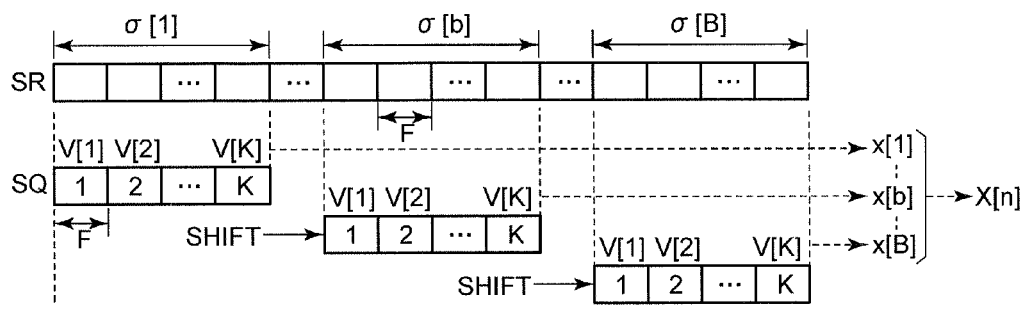
FIG. 6 illustrates operation of a first analyzer.

FIG. 6 illustrates a process executed by the first analyzer 42. As shown in FIG. 6, each of the designated note sequence SQ and the reference note sequence SR is divided into a plurality of unit periods F in the time domain. The unit period F is set to a duration corresponding to one measure of a piece of music, for example. Specifically, one measure (e.g. duration corresponding to four quarter notes) based on a tempo designated by the attribute information DA of the reference piece of music is determined as one unit period F of the reference note sequence SR, and one measure based on a tempo designated by the user through the input unit 18 is determined as one unit period F of the designated note sequence SQ. When tempo is not designated, a duration (period) corresponding to one measure based on a predetermined tempo and a predetermined beat is set as the unit period F. For example, if the tempo is 120 BPM (beats per minute) and a time signature is four-four time, the unit period F is set to 2 seconds. Processing can be simplified by setting the tempo to a predetermined value in this manner. The following description is based on the assumption that the designated note sequence SQ includes K (K being a natural number equal to or greater than 2) unit periods F and the reference note sequence SR includes a number of unit periods F, which exceeds K.

As shown in FIG. 6, the first analyzer 42 calculates a basic value $x[b]$ ($x[1]$ to $x[B]$) for each of a plurality of B cases in which the temporal position of the designated note sequence SQ with respect to the reference note sequence SR is changed. In the first embodiment, the first analyzer 22 calculates the basic value $x[b]$ for each case in which the designated note sequence SQ is moved (shifted) by the unit period F with respect to the reference note sequence SR. That is, the first analyzer 42 calculates the basic value $x[b]$ by sequentially selecting a target interval $\sigma[b]$ (a set of K unit periods F) corresponding to the designated note sequence SQ, from among the reference note sequence SR, for each case in which the position of the designated note sequence SQ is changed and comparing the designated note sequence SQ with the target interval $\sigma[b]$. The first analyzer 42 calculates the similarity index $X[n]$ based on B basic values $x[1]$ to $x[B]$ corresponding to different target intervals $\sigma[b]$ in the reference note sequence SR. Specifically, a maximum value (i.e. a value indicating a maximum similarity between the reference note sequence SR and the designated note sequence SQ) from among the B basic values $x[1]$ to $x[B]$ is selected as the similarity index $X[n]$.

The first analyzer 42 according to the first embodiment of the invention calculates a similarity $V[k]$ ($V[1]$ to $V[K]$) (k being in the range of 1 to K) for unit periods F corresponding to each other between the designated note sequence SQ and the target interval $\sigma[b]$ of the reference note sequence SR. Specifically, assuming the designated note sequence SQ and the reference note sequence SR as time series (character strings) of characters corresponding to notes, the first analyzer 42 calculates the similarity $V[k]$ based on an edit distance between a k-th unit period F in the designated note sequence SQ and a k-th unit period F in the target interval $\sigma[b]$. The first analyzer 42 calculates the basic value $x[b]$ from K similarities $V[1]$ to $V[K]$ computed for different unit periods F of one target interval $\sigma[b]$ in the reference note sequence SR. For example, the average or maximum value of the K similarities $V[1]$ to $V[K]$ is calculated as the basic value $x[b]$ for the one target interval $\sigma[b]$.

When the designated note sequence SQ is longer than the reference note sequence SR (when the number of unit periods of the designated note sequence SQ exceeds the number of unit periods of the reference note sequence SR), the length of the designated note sequence SQ may be adjusted to a length (the number of unit periods F) corresponding to the length of the reference note sequence SR by eliminating an interval corresponding to the end of the designated note sequence SQ, and then the process of FIG. 6 may be performed. Furthermore, when the designated note sequence SQ is longer than the reference note sequence SR, it is possible to change the designated note sequence SQ and the reference note sequence SR and perform the process of FIG. 6 (that is, the basic value $x[n]$ is calculated for each case in which the reference note sequence SR is shifted by the unit period F with respect to the designated note sequence SQ).

The edit distance between the designated note sequence SQ and the reference note sequence SR indicates a minimum number of manipulations necessary to modify one of the designated note sequence SQ and the reference note sequence SR into the other through elimination, insertion or substitution of a note corresponding to one character. The edit distance E between the designated note sequence SQ and the reference note sequence SR will now be described on the assumption that the k-th unit period F of the designated note sequence SQ is composed of M1 notes and the k-th unit period F of the target interval $\sigma[b]$ of the reference note sequence SR is composed of M2 notes. For example, a method using dynamic programming, described below, is preferably used to calculate the edit distance E.

A distance matrix (cost matrix) C shown in FIG. 7 is considered. The distance matrix C is a $(M1+1)$-row$\times(M2+1)$-column matrix having distances $c[m1, m2]$ as elements (m1 being in the range of 0 to M1, m2 being in the range of 0 to M2). As shown in FIG. 7, a row m1 of the distance matrix C corresponds to an m1-th note $v[m1]$ in the k-th unit period F of the designated note sequence SQ, and a column m2 of the distance matrix C corresponds to an m2-th note $v[m2]$ in the k-th unit period F of the target interval $\sigma[b]$ of the reference note sequence SR. The first analyzer 42 sets a distance $c[0, 0]$ of the 0-th row and 0-th column to 0 and calculates each distance $c[m1, m2]$ of the distance matrix C according to Equation (2).

$$c[m1,m2]=\min\{c[m1,m2-1]+1, c[m1-1,m2]+1, c[m1-1,m2-1]+\gamma\} \quad (2)$$

In Equation (2), min{ } denotes an operation of selecting a minimum value among a plurality of values in braces. As indicated by an arrow A1 in FIG. 8, $\{c[m1, m2-1]+1\}$ of Equation (2) represents increase of a sequence (insertion cost) of inserting the note $v[m2]$ in the reference note sequence SR into the designated note sequence SQ. As indicated by an arrow A2 in FIG. 8, $\{c[m1-1, m2]+1\}$ of Equation (2) represents increase of a sequence (elimination cost) of eliminating the note $v[m1]$ in the designated note sequence SQ.

As indicated by an arrow A3 in FIG. 8, $\{c[m1-1, m2-1]+\gamma\}$ of Equation (2) represents increase of a sequence of substituting the note $v[m2]$ in the reference note sequence SR for the note $v[m1]$ in the designated note sequence SQ. That is, symbol $\gamma$ in Equation (2) corresponds to an increment (referred to as "substitution cost" hereinafter) of the sequence of substituting the note $v[m2]$ in the reference note sequence SR for the note $v[m1]$ in the designated note sequence SQ. The substitution cost $\gamma$ is set to 0 when the note $v[m1]$ in the designated note sequence SQ corresponds to the note $v[m2]$ in the reference note sequence SR and set to 1 when the note v[m1] in the designated note sequence SQ does not correspond to the note v[m2] in the reference note sequence SR.

FIG. 9 shows a distance matrix C between the designated note sequence SQ (SQ={C, E, G, D, F, C, E}, M1=7) and the reference note sequence SR (SR={C, G, F, E, D, C, D, C}, M2=8). Each distance c[m1, m2] of the distance matrix C is calculated through the above-described process and a distance c[M1, M2] between row M1 and column M2 is selected as the edit distance E. The edit distance E is 6 in the example shown in FIG. 9.

The first analyzer 42 calculates the similarity V[k] based on the edit distance E computed for the k-th unit period F between the designated note sequence SQ and the reference note sequence SR. Specifically, the first analyzer 42 calculates the similarity V[k] through an operation according to equation (3).

$$V[k] = 1 - \frac{E}{E\max} \quad (3)$$

In Equation (3), Emax denotes a larger one (highest sequence of modifying one of the designated note sequence and the reference note sequence into the other) of the number M1 of notes in the k-th unit period F of the designated note sequence SQ and the number M2 of notes in the k-th unit period F within the target interval σ[b] of the reference note sequence SR. As can be known from Equation (3), the similarity V[k] increases as the edit distance E decreases (arrangement of notes in the designated note sequence SQ and arrangement of notes in the reference note sequence SR become similar to each other). As described above with reference to FIG. 6, the first analyzer 42 calculates the basic value x[b] from the K similarities V[1] to V[K] respectively corresponding to unit periods F of the target interval σ[b] and selects, as the similarity index X[n], a maximum value or the average of B basic values x[1] to x[B] corresponding to different target intervals σ[b] in the reference note sequence SR of an n-th reference piece of music. As is understood from the above description, the similarity index X[n] of a reference piece of music including an interval having note arrangement similar to arrangement of notes in the designated note sequence SQ becomes a large value.

The feature calculator 44 shown in FIG. 5 calculates a duration feature T (a duration feature TR of the reference note sequence SR and a duration feature TQ of the designated note sequence SQ) representing musical characteristics (particularly, harmonic characteristics) of a note sequence. The duration feature TR is calculated for each unit period F of the reference note sequence SR and the duration feature TQ is calculated for each unit period F of the designated note sequence SQ. A unit period F for which the edit distance E is calculated can be different from a unit period F for which the duration feature T is calculated. The duration feature TR of the reference note sequence SR may be prestored in the storage unit 14. That is, the configuration in which the feature calculator 44 calculates the duration feature TR of the reference note sequence SR may be omitted.

Figure 10:
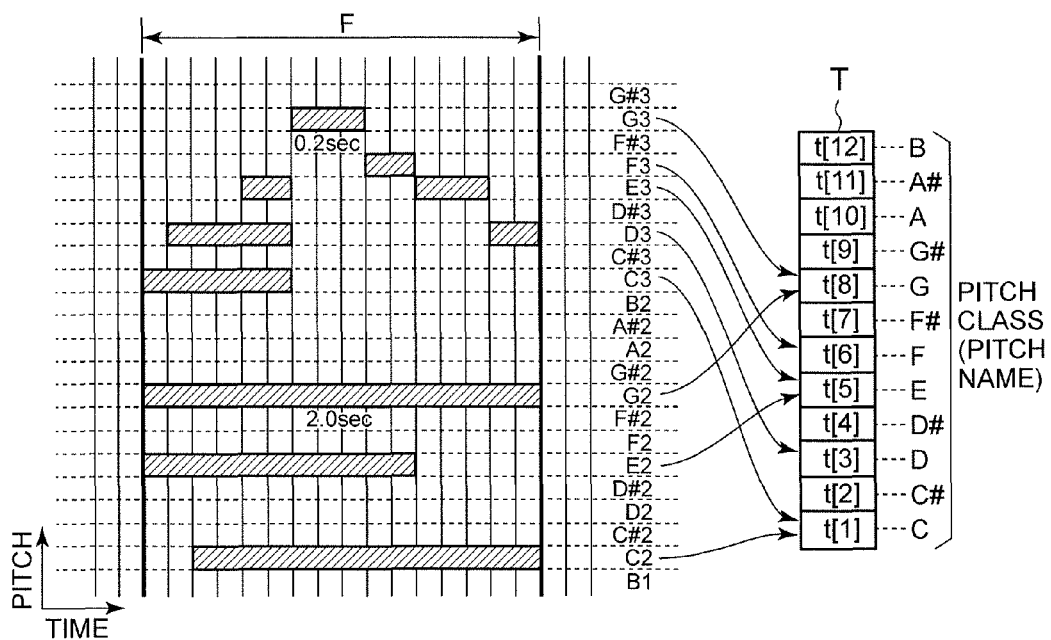
FIG. 10 illustrates a duration feature.

FIG. 10 illustrates a note sequence (piano roll) arranged in a coordinate system to which a time axis (horizontal axis) and a pitch axis (vertical axis) are set. As shown in FIG. 10, the duration feature T (TR and TQ) is a 12-dimensional vector in which 12 element values t[1] to t[12] corresponding to different pitch classes (pitch names) are arranged. A pitch class in the first embodiment is a set of pitches (note numbers) having a common pitch name. That is, a plurality of pitches at frequencies of a power of 2 (having the same pitch name in different octaves) belongs to the same pitch class. The element values t[1] to t[12] are calculated for 12 pitch classes corresponding to 12 semitones (C, C#, D, D#, E, F, F#, G, G#, A, A#, B).

An element value t[c] corresponding to a c-th (c being in the range of 1 to 12) pitch class is set to a value based on the sum τa of durations of notes belonging to the corresponding pitch class from among a plurality of notes included in one unit period F. Specifically, the element value t[c] is the ratio (t[c]=τa/τb) of the sum τa of durations of notes belonging to the corresponding pitch class from among a plurality of notes included in one unit period F to the sum τb of durations of all notes in the unit period F. Division according to the sum τb is an operation of normalizing the element value t[c] to a value in the range of 0 to 1. As shown in FIG. 10, when a note (having a duration of 2 seconds) of pitch G2 and a note (having a duration of 0.2 seconds) of pitch G3, which belong to the pitch class (pitch name G), are included in the unit period F (τa=2+0.2=2.2) and the sum τb of durations of all notes in the unit period F is 8 seconds, the element value t[8] corresponding to the pitch class (c=8) of the pitch name G in the duration feature T is 0.275 (=2.2/8).

The second analyzer 46 shown in FIG. 5 calculates a similarity index Y[n] (Y[1] to Y[N]) for each of N reference pieces of music by comparing the duration feature TQ of each unit period F of the designated note sequence SQ with the duration feature TR of each unit period F of the reference note sequence SR. The similarity index Y[n] indicates a degree to which the reference note sequence SR of the n-th reference piece of music and the designated note sequence SQ are similar to each other from a harmonic perspective. The similarity index X[n] is a measure for evaluating a correlation between note sequences by ignoring the duration of each note, whereas the similarity index Y[n] is a measure for evaluating a correlation between note sequences from a harmonic perspective by emphasizing notes having a long duration.

Figure 11:
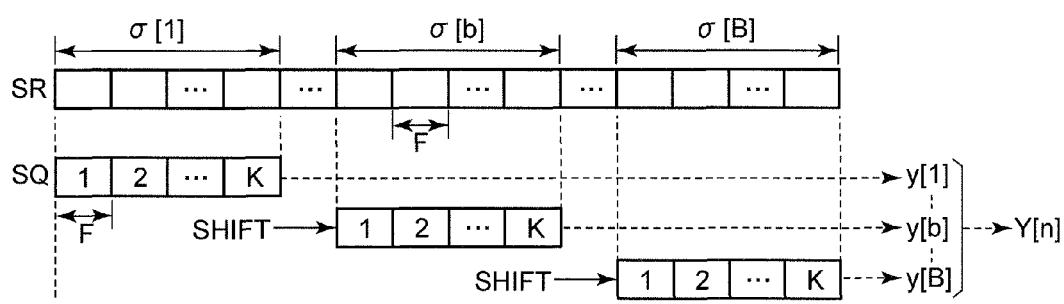
FIG. 11 illustrates operation of a second analyzer.

As shown in FIG. 11, the second analyzer 46 calculates a basic value y[b] (y[1] to y[B]) for each of a plurality of B cases in which the temporal position of the designated note sequence SQ with respect to the reference note sequence SR is changed. Specifically, the basic value y[b] is calculated for each case in which the designated note sequence SQ is shifted by one unit period F with respect to the reference note sequence SR. That is, the second analyzer 46 calculates the basic value y[b] by sequentially selecting a target interval σ[b] in the reference note sequence SR and comparing duration features TQ corresponding to K unit periods F in the designated note sequence SQ with duration features TR corresponding to K unit periods F in the target interval σ[b].

Specifically, the second analyzer 46 calculates, as the basic value y[b], a distance (e.g. cosine distance) between the mean vector of the duration features TQ corresponding to K unit periods F in the designated note sequence SQ and the mean vector of the duration features TR corresponding to K unit periods F in the target interval σ[b]. Accordingly, the basic value y[b] increases as a similarity between the duration feature TQ of each unit period F of the designated note sequence SQ and the duration feature TR of each unit period F of the target interval σ[b] increases. The second analyzer 46 calculates the similarity index Y[n] based on B basic values y[1] to y[B] corresponding to target intervals σ[b] sequentially set in the reference note sequence SR. For example, a maximum value (i.e. the basis value y[b] of a target interval σ[B] including a duration feature T most similar to each duration feature T of the designated note sequence SQ) from among the B basic values y[1] to y[B] is calculated as the similarity index Y[n]. Accordingly, the similarity index Y[n] of a reference piece of music including an interval musically (harmonically) similar to the designated note sequence is set to a large value. Otherwise, the average of the B basic values y[1] to y[B] may be calculated as the similarity index Y[n].

The index calculator 48 shown in FIG. 5 calculates a similarity index Z[n] based on the similarity index X[n] computed by the first analyzer 42 and the similarity index Y[n] computed by the second analyzer 46 for each reference piece of music. For example, the index calculator 48 calculates the weighted sum of the similarity index X[n] and the similarity index Y[n] as the similarity index Z[n] of the n-th reference piece of music, as represented by Equation (4).

$$Z[n]=W_X X[n]+W_Y Y[n] \quad (4)$$

In Equation (4), $W_X$ denotes a weight (i.e. a degree by which similarity of note arrangement is weighted) with respect to the similarity index X[n], and $W_Y$ denotes a weight (i.e. a degree by which similarity of harmony sense is weighted) with respect to the similarity index Y[n] (typically $W_X+W_Y=1$). The weights $W_X$ and $W_Y$ are variably set according to user manipulation through the input unit 18. Furthermore, a configuration in which the weights $W_X$ and $W_Y$ are fixed to a predetermined value (e.g. $W_X=W_Y=0.5$) may be employed. As is understood from the above description, the similarity index Z[n] increases as the similarity between the designated note sequence SQ and the reference note sequence SR increases. The method of calculating the similarity index Z[n] based on the similarity index X[n] and the similarity index Y[n] may be appropriately modified. For example, it is possible to employ a configuration in which a product of the similarity index X[n] and the similarity index Y[n] is calculated as the similarity index Z[n] or a configuration in which the similarity index Z[n] is calculated by executing a predetermined operation on the similarity index X[n] and the similarity index Y[n].

As shown in FIG. 4, the display controller 28 displays a numerical value 326 (e.g. P·($W_X$·X[n]/Z[n]) derived from the similarity index X[n] and a numerical value 328 (e.g. P·($W_Y$·Y[n]/Z[n]) derived from the similarity index Y[n] from among evaluation indices P along with the numerical value 324 of the evaluation index P computed by the evaluator 26 in the second area 32. Accordingly, the user can respectively confirm accuracy (similarity index X[n]) of note arrangement and accuracy (similarity index Y[n]) of harmony sense.

Figure 12:
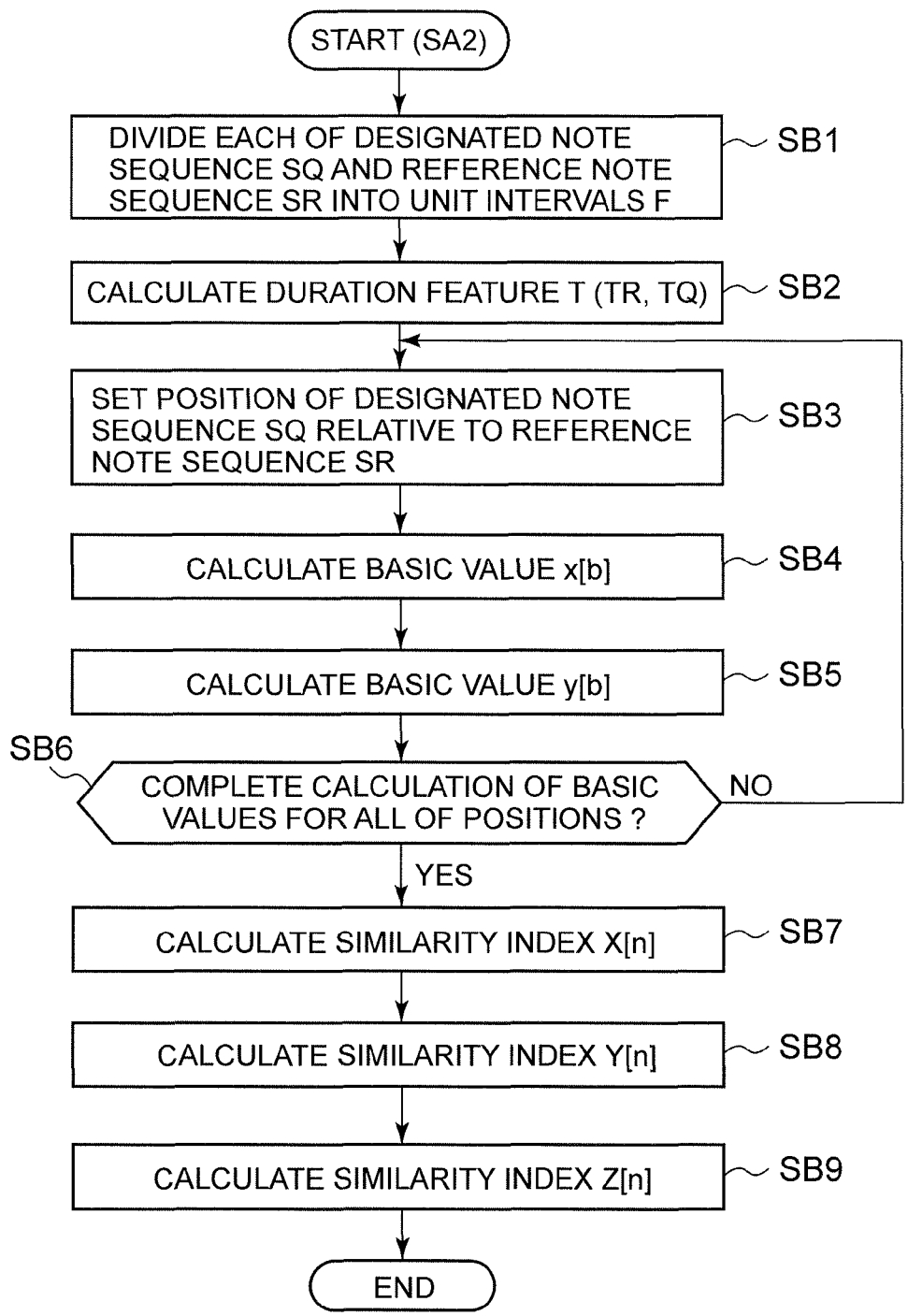
FIG. 12 is a flowchart showing an example of process for calculating a similarity index.

FIG. 12 is a flowchart showing a concrete example of the process (FIG. 3, Step SA2) performed by the processing unit 12 (similarity analyzer 22) for calculating the similarity index Z[n]. The processing unit 12 divides each of the designated note sequence SQ and the reference note sequence SR into a plurality of unit periods F (SB1), and further functions as the feature calculator 44 for calculating the duration feature T for each unit period F (namely, the duration feature TR of the reference note sequence SR and the duration feature TQ of the designated note sequence SQ) (SB2). Then, the processing unit 12 sets a position of the designated note sequence SQ relative to the reference note sequence SR along the time axis (SB3), and executes calculation of the basic value x[b] corresponding to the position of the designated note sequence (SB4) and calculation of the basic value y[b] corresponding to the position of the designated note sequence (SB5). The calculation of the basic value y[n] utilizes the duration feature TR and duration feature TQ which are calculated at Step SB2.

The processing unit 12 determines whether or not the calculation of the basic values x[b] (x[1]–x[B]) and y[b] (y[1]–y[B]) has been completed for all of the positions (B number of positions) (SB6). If the calculation is not yet completed (SB6, NO), the position of the designated note sequence SQ is changed relative to the reference note sequence SR (SB3), and then the calculation of the basic value x[b] (SB4) and calculation of the basic value y[b] (SB5) are performed for the changed position of the designated note sequence SQ. On the other hand, If calculation of B number of the basic values x[1]–x[B] and B number of the basic values y[1]–y[B] are completed (SB6, YES), the processing unit 12 executes calculation of the similarity index X[n] based on the basic values x[1]–x[B] (SB7) and calculation of the similarity index Y[n] based on the basic values y[1]–y[B] (SB8). The computation of the basic value x[b] (SB4) and computation of the similarity index X[n] (SB7) are performed by the first analyzer 42, and computation of the basic value y[b] (SB5) and computation of the similarity index Y[n] (SB8) are performed by the second analyzer 46. The processing unit 12 (index calculator 48) calculates the similarity index Z[n] based on the similarity index X[n] and the similarity index Y[n] (SB9). The above described operation is executed at Step SA2 of FIG. 3.

Figure 13:
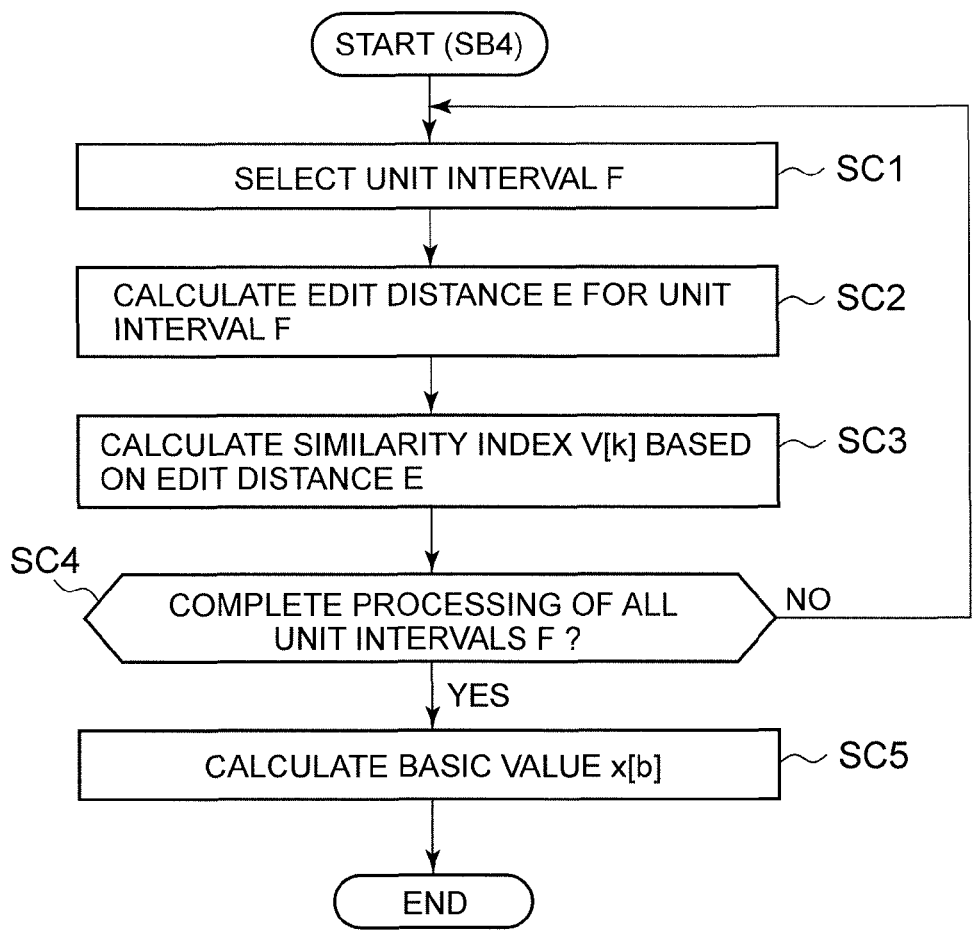
FIG. 13 is a flowchart showing an example of process for calculating a basic value.

FIG. 13 is a flowchart showing a concrete example of the process (Step SB4 of FIG. 12) for calculating the basic value x[b] performed by the processing unit 12 (first analyzer 42). The processing unit 12 selects a k-th unit period F from the reference note sequence SR and a corresponding k-th interval F from the designated note sequence SQ under the positional relationship set by Step SB3 of FIG. 13 between the reference not sequence SR and the designated note sequence SQ (SC1), and calculates an edit distance E between the k-th unit period of the reference note sequence SR and the corresponding k-th unit period of the designated note reference SQ (SC2). Then, the processing unit 12 calculates similarity V[k] by applying the edit distance E calculated at Step SC2 to Equation (3), and thereafter determines whether or not the calculation of the similarity V[k] (V[1]–V[K]) has been completed for all of K number of unit periods F (SC4). If the calculation is not yet completed (SC4, NO), the unit period F is incremented as target of calculation of similarity V[k] (SC1), and then the calculation of edit distance E (SC2) and calculation of similarity V[k] (SC3) are performed. If the calculation of K number of similarities V[1]–V[K] are completed (SC4, YES), the processing unit 12 calculates basic value x[b] based on the K number of similarities V[1]–V[K] (SC5). The above described operation is executed in Step SB4 of FIG. 12.

As is understood from the above description, the similarity analyzer 22 functions as an element that calculates the similarity index Z[n] based on the edit distance E (similarity index X[n]) between the designated note sequence SQ and the reference note sequence SR and a comparison result (similarity index Y[n]) between each duration feature TQ of the designated note sequence SQ and each duration feature TR of the reference note sequence SR. That is, in the first embodiment of the present invention, the similarity index Z[n] is calculated using both the similarity index X[n] based on arrangements of notes of the designated note sequence SQ and the reference note sequence SR and the similarity index Y[n] based on harmony senses of the designated note sequence SQ and the reference note sequence SR. Accordingly, it is possible to evaluate the correlation between the designated note sequence SQ and the reference note sequence SR (performance of the user) with high accuracy, compared to the configuration using only an edit distance between note sequences.

Furthermore, the similarity index X[n] and the similarity index Y[n] are calculated based, respectively, on the basic value x[n] and the basic value y[b] computed for each of a plurality of cases in which the position of the designated note sequence SQ with respect to the reference note sequence SR is changed. Accordingly, it is possible to designate a target piece of music corresponding to the designated note sequence SQ with high accuracy and appropriately evaluate the similarity between the designated note sequence SQ and the reference note sequence SR (performance of a specific interval of a reference piece of music) even when the user designates the specific interval of the reference piece of music as the designated note sequence SQ (when the designated note sequence SQ corresponds to only a specific part of the reference note sequence SR).

Second Embodiment

A second embodiment of the present invention will now be described. In each embodiment illustrated below, elements whose operations or functions are similar to those of the first embodiment will be denoted by the same reference numerals as used in the above description and a detailed description thereof will be omitted as appropriate.

Note sequences of polyphonic music generated when a plurality of notes constituting a chord and a plurality of notes corresponding to different playing parts are sounded simultaneously may be specified as the reference note sequence SR and the designated note sequence SQ. The order of designating notes constituting a chord inputted by the user to the designated note sequence SQ can be varied according to manipulation (a fine difference between timings of inputting notes) of the user through the input unit 18, because timings of inputting a plurality of note sequences are different even if the user attempts to simultaneously designate the plurality of note sequences by manipulating the input unit 18. For example, although the user intends to designate a chord of "do, mi, so", notes constituting the chord may be arranged in various orders such as "do, so, mi", "mi, do, so", "so, do, mi", etc. in the designated note sequence SQ. To compensate for variation in the order of notes, which may be generated in the designated note sequence SQ as described above, so as to evaluate a similarity between a piece of music actually intended by the user and each reference piece of music with high accuracy, the order of consecutive notes in the designated note sequence SQ is permitted to be changed to calculate the edit distance E in the second embodiment which will be described below.

Figures 14, 15:
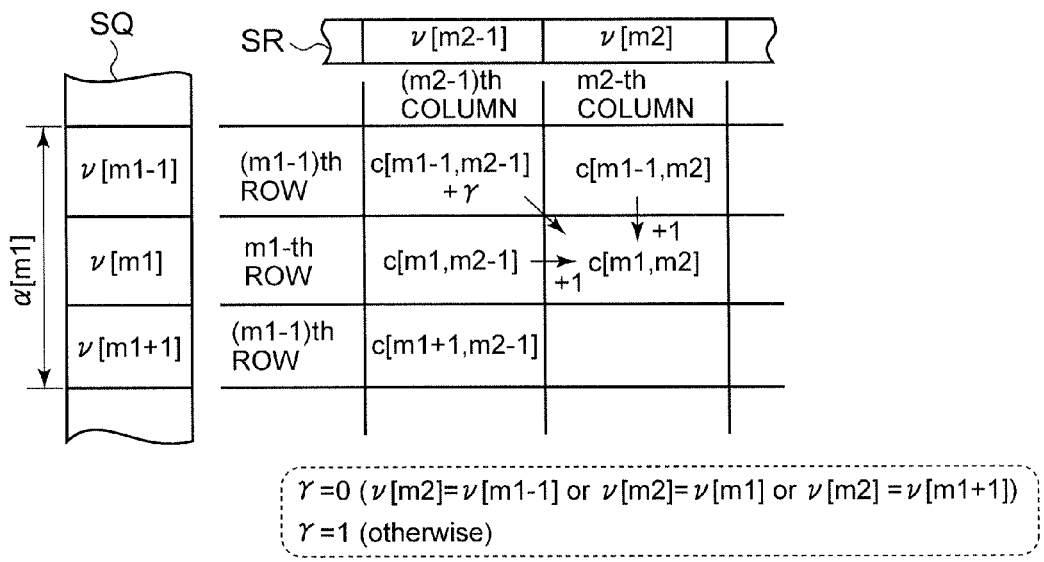
FIG. 14 illustrates each distance in a distance matrix according to a second embodiment of the invention.
FIG. 15 illustrates an exemplary distance matrix according to the second embodiment of the invention in detail.

The first analyzer 42 according to the second embodiment calculates each distance c[m1, m2] of the distance matrix C according to Equation (2). While the same insertion cost and elimination cost as those of the first embodiment are used to calculate the distance c[m1, m2], the method of calculating the substitution cost γ is different from that of the first embodiment. FIG. 14 illustrates the substitution cost γ used for the first analyzer 42 of the second embodiment to calculate the distance c[m1, m2] of the distance matrix C (Equation (2)).

As shown in FIG. 14, the first analyzer 42 sets a tolerance period (margin) α[m1] including a note v[m1] of the designated note sequence SQ within the designated note sequence SQ. FIG. 14 illustrates a case in which a tolerance period α[m1] corresponding to three notes including the note v[m1], immediately previous note v[m1−1], and the next note v[m1+1] is set. The first analyzer 42 sets the substitution cost γ, which is applied to calculation of the distance c[m1, m2] corresponding to the note v[m1] in the designated note sequence SQ and the note v[m2] in the reference note sequence SR, to 0 (first value) when any of the three notes (v[m1−1], σ[m1] and v[m1+1]) in the tolerance period α[m1] of the designated note sequence SQ corresponds to the note v[m2] in the reference note sequence SR and sets the substitution cost γ to 1 (second value) when the note v[m2] in the reference note sequence SR does not correspond to any of the notes in the tolerance period α[m1]. Accordingly, the distance c[m1, m2] (edit sequence) does not increase when arrangement of the notes in the designated note sequence SQ corresponds to arrangement in which consecutive notes in the reference note sequence SR have been changed. The substitution cost γ may be set to 0 or 2 (or a numerical value greater than 2).

FIG. 15 shows a distance matrix C with respect to the same designated note sequence SQ and reference note sequence SR as those shown in FIG. 9 according to the first embodiment, which is calculated by the first analyzer 42 according to the second embodiment. Since notes consecutive in the designated note sequence SQ are permitted to be changed in the second embodiment, the edit distance (E=2) calculated in the second embodiment is smaller than the edit distance (E=6) of the first embodiment, as shown in FIG. 15. The similarity index X[n] based on the edit distance E is calculated in the same manner as the first embodiment.

Figure 16:
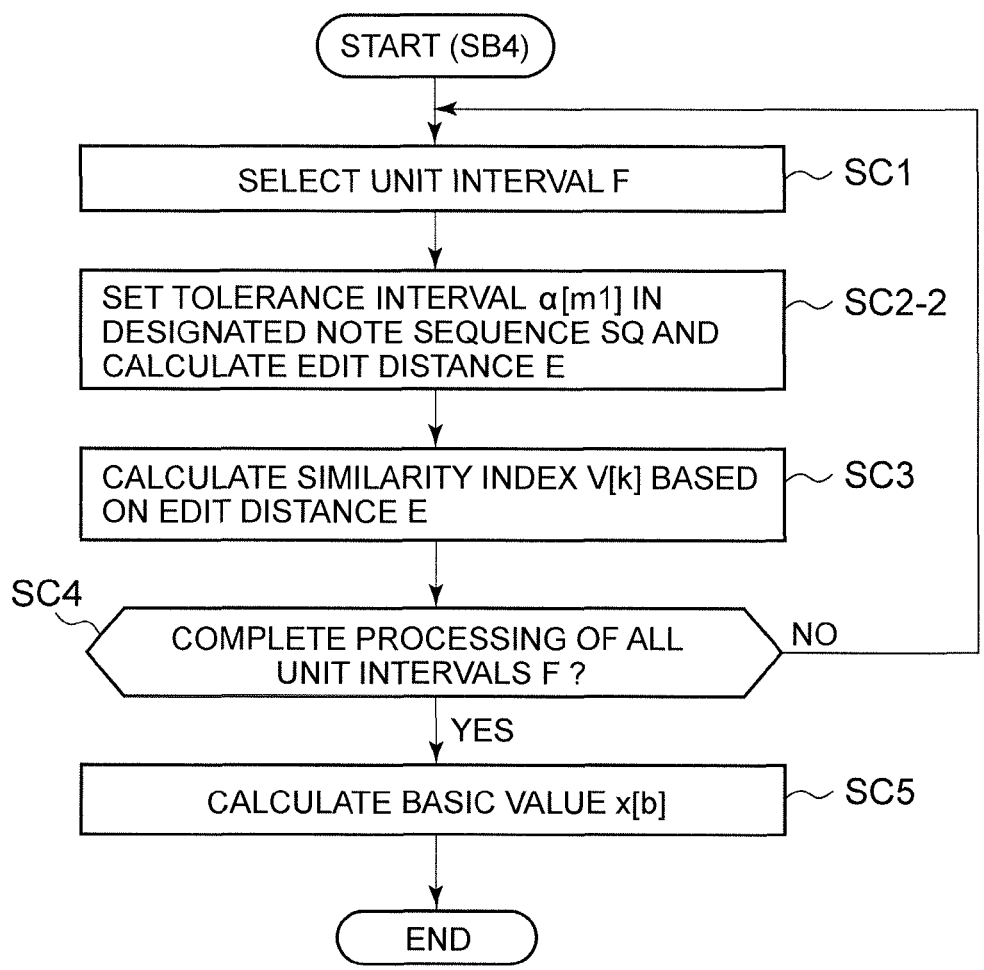
FIG. 16 is a flowchart showing operation of a first analyzer in the second embodiment.

FIG. 16 is a flowchart showing operation of the first analyzer 42 in the second embodiment. The process of FIG. 16 is executed in pace of the process of FIG. 13 executed in the first embodiment. In the process of FIG. 16, Step SC2-2 substitutes for Step SC2 in the process of FIG. 13. In Step SC2-2 of FIG. 16, the first analyzer 42 sets the tolerance period α[m1] in the designated note sequence SQ as described with reference to FIG. 15, and calculates the edit distance E. The other processes executed by the first analyzer 42 are similar as the processes executed by the first embodiment (FIG. 13).

The second embodiment can achieve the same effect as that of the first embodiment. Since the edit distance E between the designated note sequence SQ and the reference note sequence SR is calculated by permitting notes consecutive in the designated note sequence SQ to be changed in the second embodiment, it is possible to analyze the correlation between the designated note sequence SQ and the reference note sequence SR (select a target piece of music) robustly against variation in the order of notes of the designated note sequence SQ. That is, even when the order of notes of the designated note sequence SQ is different from the order of notes intended by the user (i.e. the order of notes in a reference note sequence that the user wants to search), it is possible to calculate a high similarity index X[n] for the reference piece of music intended by the user. Provided that the reference note sequence SR includes a chord of "do, mi, so", even if the user inputs tones of the chord in the order of "do, so, mi", "mi, do, so" or "so, do, mi", the similarity index X[n] corresponds to a similarity index obtained when "do, mi, so" is designated. Furthermore, it is possible to easily achieve the above effect by determining whether each note in the tolerance period α[m1] is equal to the note v[m2], instead of determining whether the note v[m1] and the note v[m2] are equal to each other in the first embodiment.

Third Embodiment

Figures 17, 18:
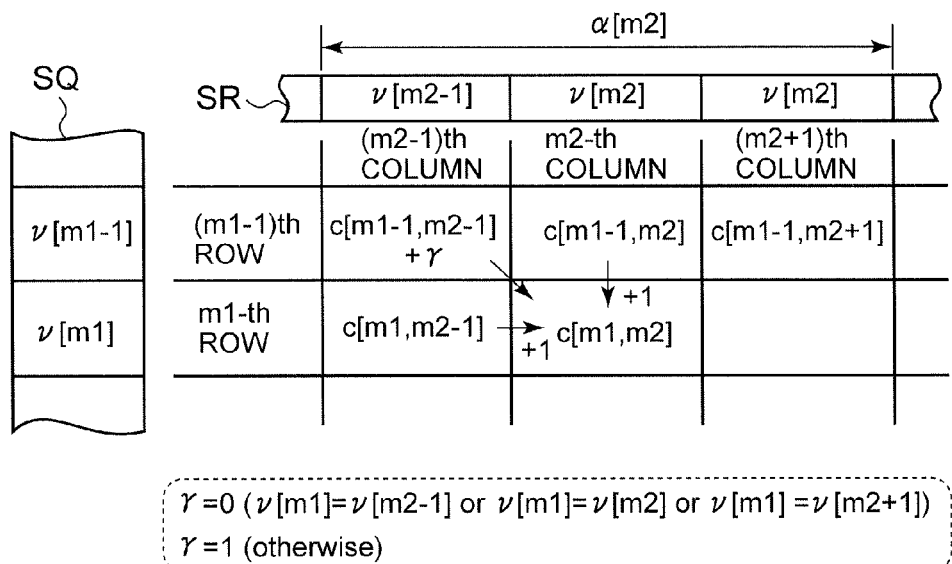
FIG. 17 illustrates each distance in a distance matrix according to a third embodiment of the invention.
FIG. 18 illustrates an exemplary distance matrix according to the third embodiment of the invention in detail.

FIG. 17 illustrates the substitution cost γ used for the first analyzer 42 of the third embodiment to calculate the distance c[m1, m2] of the distance matrix C (Equation (2)). The first analyzer 42 of the second embodiment sets the tolerance period α[m1] in the designated note sequence SQ. The first analyzer 42 of the third embodiment sets a tolerance period α[m2] including the note v[m2] of the reference note sequence SR within the reference note sequence SR, as shown in FIG. 17. FIG. 17 illustrates a case in which a tolerance period α[m2] corresponding to three notes including the note v[m2], immediately previous note v[m2-1], and the next note v[m2+1] is set.

The first analyzer 42 sets the substitution cost γ, which is applied to calculation of the distance c[m1, m2] corresponding to the note v[m1] in the designated note sequence SQ and the note v[m2] in the reference note sequence SR, to 0 (first value) when the note v[m1] in the designated note sequence SQ corresponds to any of the three notes (v[m2-1], v[m2] and v[m2+1]) in the tolerance period α[m2] and sets the substitution cost γ to 1 (second value) when the note v[m1] does not correspond to any of the notes in the tolerance period α[m2]. Accordingly, the distance c[m1, m2] does not increase when arrangement of the notes in the reference note sequence SR corresponds to arrangement in which consecutive notes in the designated note sequence SQ have been changed. The distance c[M1, M2] between row M1 and column M2 of the distance matrix C, which is calculated through the above process, is selected as the edit distance E. The similarity V[k] based on the edit distance E and the similarity index X[n] based on the similarity V[k] are calculated in the same manner as the first embodiment.

FIG. 18 shows a distance matrix C with respect to the same designated note sequence SQ and reference note sequence SR as those shown in FIG. 9, which is calculated by the first analyzer 42 of the third embodiment. The edit distance (E=4) calculated in the third embodiment is smaller than the edit distance (E=6) of the first embodiment, as shown in FIG. 18. The third embodiment can achieve the same effect as that of the second embodiment.

Figure 19:
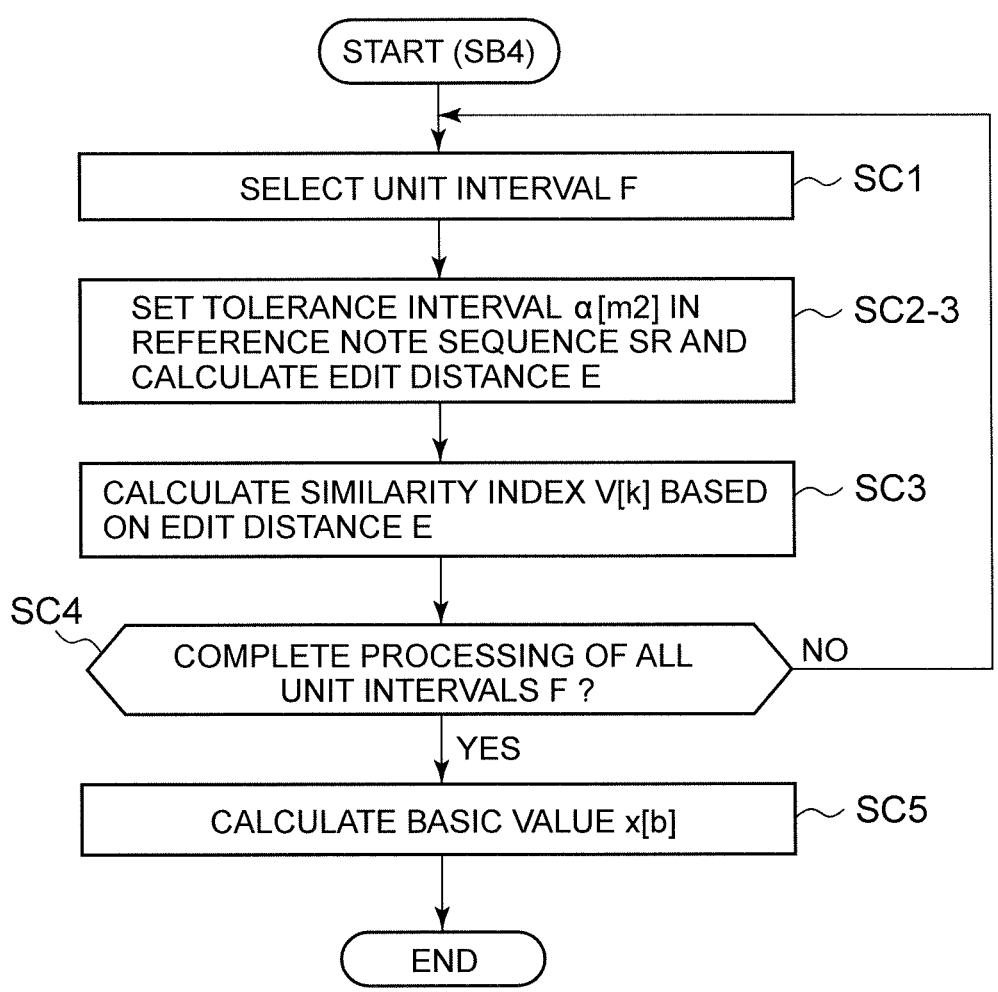
FIG. 19 is a flowchart showing operation of a first analyzer in the third embodiment.

FIG. 19 is a flowchart showing operation of the first analyzer 42 in the third embodiment. The process of FIG. 19 is executed in pace of the process of FIG. 13 executed in the first embodiment. In the process of FIG. 19, Step SC2-3 substitutes for Step SC2 in the process of FIG. 13. In Step SC2-3 of FIG. 19, the first analyzer 42 sets the tolerance period α[m2] in the reference note sequence SR as described with reference to FIG. 17 and calculates the edit distance E. The other processes executed by the first analyzer 42 are similar as the processes executed by the first embodiment (FIG. 13).

Fourth Embodiment

As can be seen from FIG. 15 and FIG. 18, the edit distance (E=2) when the tolerance period α[m1] is set in the designated note sequence SQ can be different from the edit distance (E=4) when the tolerance period α[m2] is set in the reference note sequence SR. The first analyzer 42 of the fourth embodiment calculates both the edit distance (EQ) when the tolerance period α[m1] is designated in the designated note sequence SQ and the edit distance (ER) when the tolerance period α[m2] is designated in the reference note sequence SR and computes the edit distance E (or similarity index X[n]) based on the edit distance EQ and the edit distance ER. For example, the first analyzer 42 calculates the average (typically simple average) of the edit distance EQ and the edit distance ER as the edit distance E. In the case of FIG. 15 and FIG. 18, the edit distance E is calculated as 3 (=(2+4)/2). The similarity V[k] based on the edit distance E and the similarity index X[n] based on the similarity V[k] are computed in the same manner as in the first embodiment. It is possible to employ a configuration in which the similarity index X[n] is calculated using a maximum value or a minimum value between the edit distance EQ and the edit distance ER as the edit distance E or a configuration in which the edit distance E is calculated by executing a predetermined operation on the edit distance EQ and the edit distance ER (e.g. multiplying the edit distance EQ by the edit distance ER).

Figure 20:
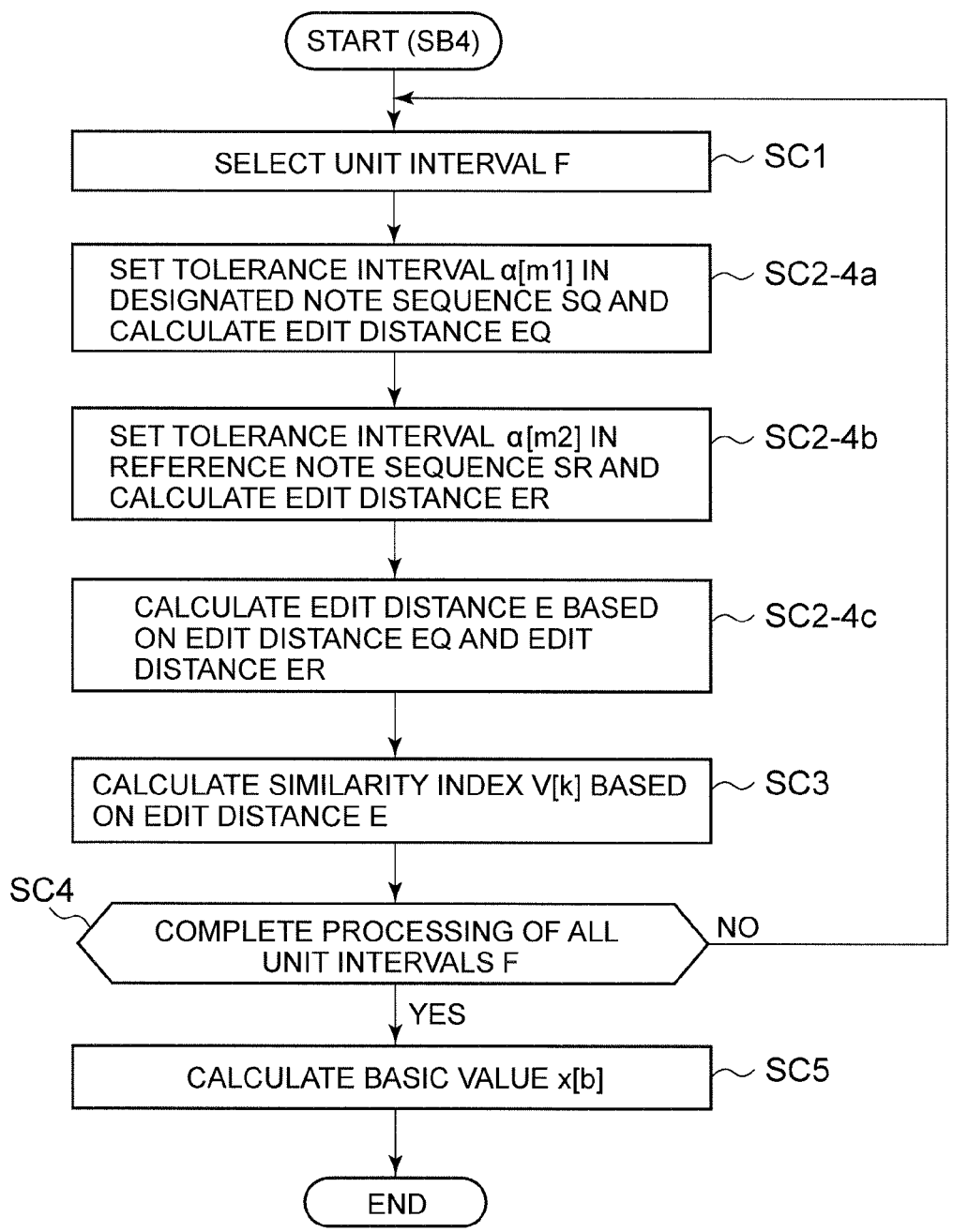
FIG. 20 is a flowchart showing operation of a first analyzer in a fourth embodiment.

FIG. 20 is a flowchart showing operation of the first analyzer 42 in the fourth embodiment. The process of FIG. 20 is executed in pace of the process of FIG. 13 executed in the first embodiment. In the process of FIG. 20, Steps SC2-4a and SC2-4c substitute for Step SC2 in the process of FIG. 13. In Step SC2-4a of FIG. 20, the first analyzer 42 sets the tolerance period α[m1] in the designated note sequence SQ and calculates the edit distance EQ in manner similar to Step SC2-2 of FIG. 16. Further, In Step SC2-4b of FIG. 20, the first analyzer 42 sets the tolerance period α[m2] in the reference note sequence SR and calculates the edit distance ER in manner similar to Step SC2-3 of FIG. 19. Then, the first analyzer 42 calculates the edit distance E (SC2-4c) as mean value of the edit distance EQ calculated at Step SC2-4a and the edit distance ER calculated in Step SC2-4b. The other processes executed by the first analyzer 42 are similar as the processes executed by the first embodiment (FIG. 13).

The fourth embodiment can achieve the same effect as that of the second embodiment. Since the edit distance E is calculated based on the edit distance EQ and the edit distance ER in the fourth embodiment, the influence of the difference between the edit distance E when the tolerance period α[m1] is set only in the designated note sequence SQ or the edit distance E when the tolerance period α[m2] is set only in the reference note sequence SR is reduced, and thus the correlation between the designated note sequence SQ and the reference note sequence SR can be evaluated with high accuracy.

Fifth Embodiment

Figure 21:
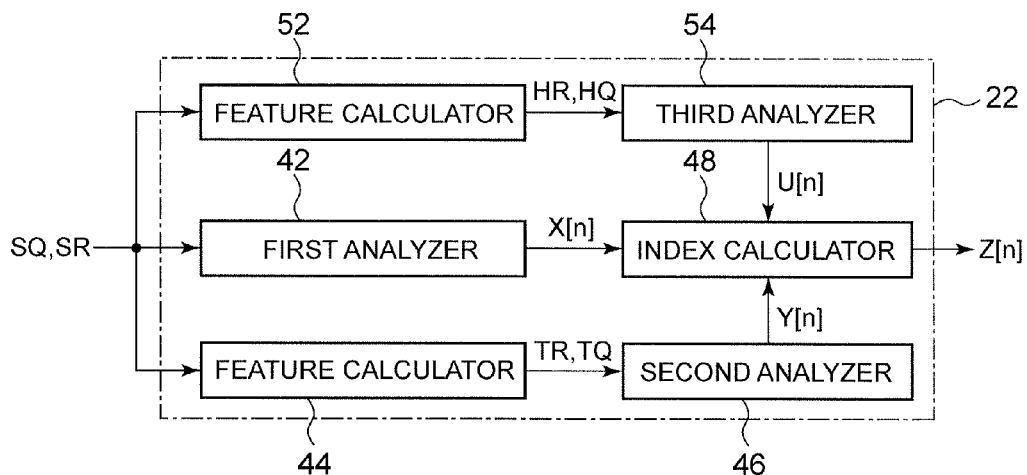
FIG. 21 is a block diagram of a similarity analyzer according to a fifth embodiment of the invention.

FIG. 21 is a block diagram of the similarity analyzer 22 according to the fifth embodiment. The similarity analyzer 22 of the fifth embodiment includes a feature calculator 52 and a third analyzer 54 in addition to the similarity analyzer 22 of the first embodiment. The feature calculator 52 calculates a time value feature H (time value feature HR of the reference note sequence SR and time value feature HQ of the designated note sequence SQ) representing musical characteristics (particularly, characteristics of a time value). A time value (phonetic value or note value) refers to a duration of a note (whole note, half note, quarter note, etc.). Accordingly, the duration of a note having a time value varies with tempo. The time value feature HR is computed for each unit period F of the reference note sequence SR and the time value feature HQ is computed for each unit period F of the designated note sequence SQ. The time value feature HR of each reference note sequence SR may be prestored in the storage unit 14 (calculation of the time value feature HR may be omitted). The unit period F is set in the same manner as each of the above-described embodiments. For example, a period corresponding to one measure when a tempo is assumed to be a predetermined value is set as the unit period F. While the time value of each note of the reference note sequence SR and the designated note sequence SQ is not correctly designated when the set value of the tempo is different from an actual value, the purpose of comparing time value features between the reference note sequence SR and the designated note sequence SQ is accomplished.

Figure 22:
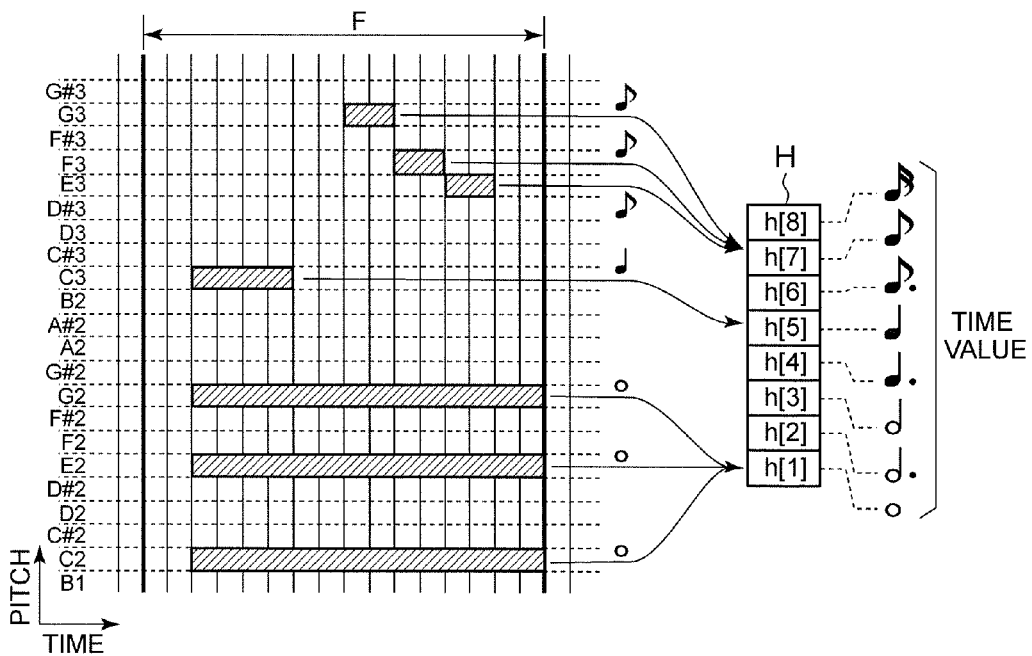
FIG. 22 illustrates a time value feature.

FIG. 22 illustrates a note sequence arranged on coordinates to which a time axis and a pitch axis are set. As shown in FIG. 22, the time value feature H (HR and HQ) is an 8-dimensional vector having 8 element values h[1] to h[8] corresponding to different time values (note durations). In FIG. 22, the element values h[1] to h[8] respectively corresponding to 8 time values, namely, whole note, dotted half note, half note, dotted quarter note, quarter note, dotted eighth note, eighth note and sixteenth note, are illustrated.

Each of notes in each unit period F of each of the reference note sequence SR and the designated note sequence SQ is classified as any of 8 time values based on the duration and tempo of the corresponding note. An element value h[d] corresponding to a d-th (d being in the range of 1 to 8) time value is set to a numerical value based on the total number of notes classified as the d-th time value from among a plurality of notes present in one unit period F. Specifically, the element value h[d] corresponds to the ratio (h[d]=μa/μb) of the total number μa of notes classified as the d-th time value from among the plurality of notes in the unit period F to the total number μb of notes in the unit period F. Division according to the total number ρb is an operation of normalizing the element value h[d] to a numerical value in the range of 0 to 1. For example, if 7 notes are present in the unit period F, as shown in FIG. 22, element value h[1] is set to 3/7 since 3 notes are classified as a whole note (d=1), element value h[5] is set to 1/7 because one note is classified as a quarter note (d=5), element value h[7] is set to 3/7 because 3 notes are classified as an eighth note (d=7), and the remaining element values h[d] (h[2], h[3], h[4] and h[6]) are set to 0. The feature calculator 52 shown in FIG. 21 calculates the time value feature H (HR and HQ) for each unit period F for each of the reference note sequence SR and the designated note sequence SQ. A note (e.g. triplet) that does not correspond to any of the 8 time values matched to element values h[d] is approximately classified as a time value closest to the duration of the note.

The third analyzer 54 calculates a similarity index U[n](U [1] to U[N]) for each of N reference pieces of music by comparing the time value feature HQ of each unit period F of the designated note sequence SQ with the time value feature HR of each unit period F of the reference note sequence SR. The similarity index U[n] is an indicator for evaluating a similarity between each time value feature HQ of the designated note sequence SQ and each time value feature HR of the reference note sequence SR.

A method of calculating the similarity index U[n] by the third analyzer 54 corresponds to the method of calculating the similarity index Y[n] by the second analyzer 46 (FIG. 11). That is, the third analyzer 54 calculates a basic value u[b] (u[1] to u[B]) for each of a plurality of B cases in which the temporal position of the designated note sequence SQ with respect to the reference note sequence SR is changed and calculates a value (e.g. maximum value or average) based on the B basic values u[1] to u[B] as the similarity index U[n]. For example, a distance (e.g. cosine distance) between the mean vector of time value features HQ corresponding to K unit periods F of the designated note sequence SQ and the mean vector of time value features HR corresponding to K unit periods F in the target interval σ[b] of the reference note sequence SR is preferably used as the basic value u[b].

As is understood from the above description, the similarity index U[n] increases as the number of notes corresponding to each time value in the designated note sequence SQ becomes similar to the number of notes corresponding to each time value in the reference note sequence SR (that is, time value features become similar to each other between the designated note sequence SQ and the reference note sequence SR). That is, the above-described similarity index X[n] is used as an index for evaluating a correlation between note sequences from the viewpoint of note arrangement (note name and arrangement order), whereas the similarity index U[n] is used as an index for evaluating a correlation between note sequences from the viewpoint of the number of notes corresponding to each time value by ignoring note arrangement (note name and arrangement order).

The index calculator 48 according to the fifth embodiment calculates, for each reference piece of music, a similarity index Z[n] corresponding to the sum of the similarity index X[n] calculated by the first analyzer 42, the similarity index Y[n] calculated by the second analyzer 46 and the similarity index U[n] calculated by the third analyzer 54. Specifically, the index calculator 48 calculates the weighted sum of the similarity indices X[n], Y[n] and U[n] as the similarity index Z[n], as represented by Equation (5).

$$Z[n]=W_X X[n]+W_Y Y[n]+W_U U[n] \quad (5)$$

In Equation (5), $W_U$ denotes a weight (i.e. a degree by which a similarity between the number of notes corresponding to each time value in the designated note sequence SQ and the number of notes corresponding to each time value in the reference note sequence SR is emphasized) with respect to the similarity index U[n] (typically $W_X+W_Y+W_U=1$). The weight $W_U$ is set to a value designated by the user or a predetermined fixed value like the weights $W_X$ and $W_Y$. The operation (selection of a target piece of music) of the music selector 24 and the operation (calculation of the evaluation index P) of the evaluator 26 using the similarity index Z[n] correspond to those in each of the above-described embodiments.

The fifth embodiment can achieve the same effect as that of the first embodiment. Since the result (similarity index U[n]) of comparison of time value features H based on the time value of each note between the reference note sequence SR and the designated note sequence SQ is reflected in the similarity index Z[n] in the fifth embodiment, the correlation (performance accuracy of the user) between the reference note sequence SR and the designated note sequence SQ can be evaluated with high accuracy, compared to the configuration in which only the edit distance between the note sequences is used. Particularly, since characteristics of the time value (duration) of each note are reflected in the time value feature H in the fifth embodiment, it is possible to evaluate the accuracy of the duration of each note in the designated note sequence SQ according to the fifth embodiment. While the present invention is based on the first embodiment in the above description, the configuration of the fifth embodiment using the time value feature H (HR and HQ) can be equally applied to the second, third and fourth embodiments. For example, a configuration in which the similarity index Z[n] is calculated based on the similarity indices X[n] and U[n] (a configuration in which calculation of the similarity index Y[n] is omitted) can be employed.

Sixth Embodiment

In the first embodiment, a reference piece of music having the maximal similarity index Z[n] is selected as the target piece of music. However, there is a case where the reference piece of music having the maximal similarity Z[n] does not coincide with a reference piece of music intended by the user (namely, the case where a similarity index Z[n] of a reference piece of music different from a reference piece of music intended by the user becomes maximal). The evaluation index P specified for a reference piece of music other than the target piece of music intended by the user does not indicate a degree of skill for actually playing the target piece of music. In consideration of the above situation, the music selector 24 of the sixth embodiment first selects a plurality of reference pieces of music (hereafter referred to as "candidate piece of music") based on their similarity indices Z[n], and then selects one piece of music which is designated by the user.

Figure 23:
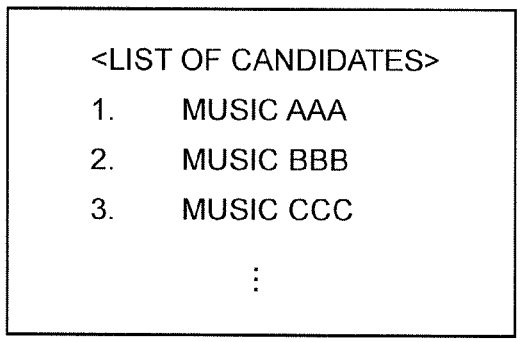
FIG. 23 is a schematic diagram showing a candidate list image.

Specifically, the music selector 24 of this embodiment specifies a plurality of reference pieces of music having similarity indices exceeding a predetermined threshold value as the candidate pieces of music from among N reference pieces of music. The display controller 28 displays on the display unit 16 an image (hereafter candidate list image) presenting identification codes (titles of music) indicated by attribute information DA of the candidate pieces of music selected by the music selector 24. FIG. 23 shows an example of the candidate list image. The candidate list image lists up each title of a plurality of candidate pieces of music in descending order of their similarity indices Z[n]. The user can designate one reference piece of music intended by the user from among the plurality of candidate pieces of music presented in the candidate list image, for example, by operating the input unit 18. The music selector 24 selects the candidate piece of music designated by the user as the target piece of music. The evaluator 26 specifies the evaluation index P based on the similarity index Z[n] of the target piece of music selected by the music selector 24 in manner similar to the first embodiment. By the way, method of selecting a plurality of candidate pieces of music is contrivable. For example, a predetermined number of reference pieces of music (for example, five pieces) having similarity indices Z[n] ranked to a top group are selected from among the N number of the reference pieces of music.

Figure 24:
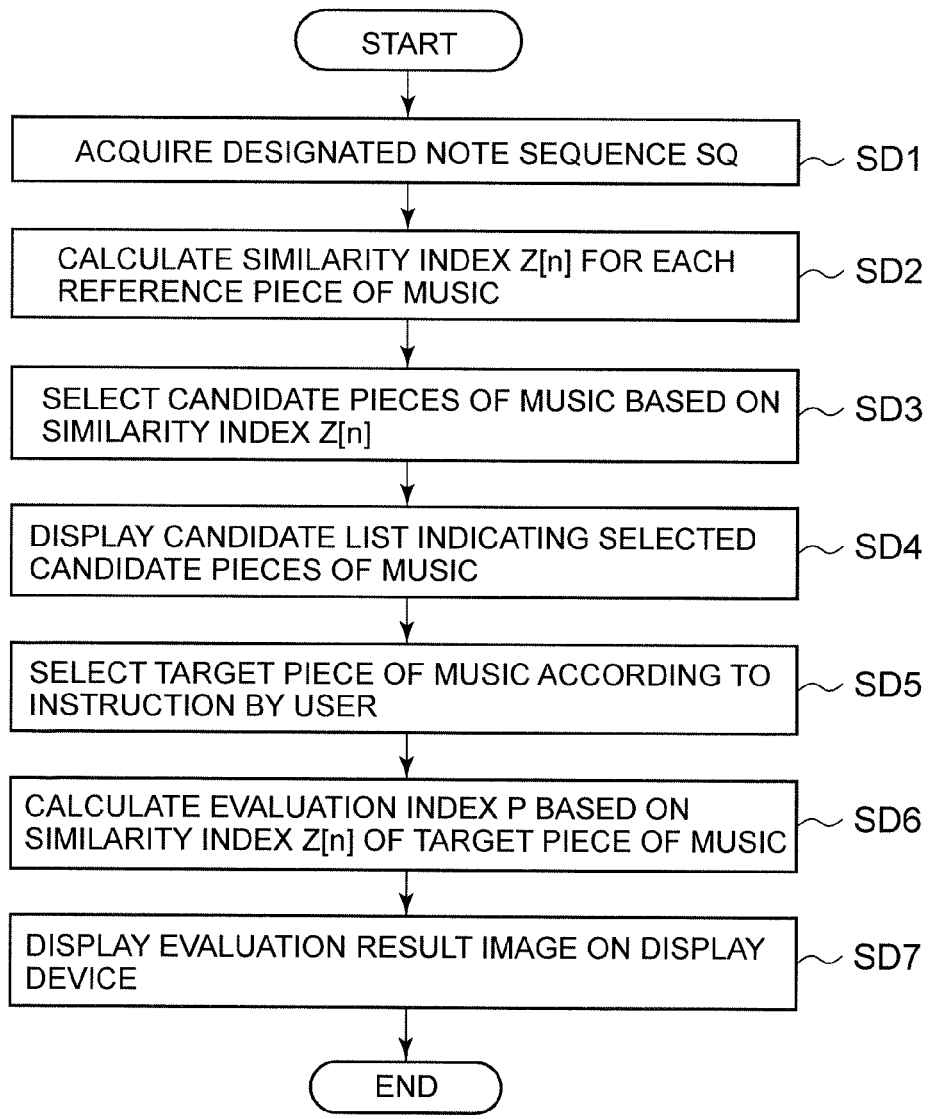
FIG. 24 is a flowchart showing operation of a sixth embodiment.

FIG. 24 is a flowchart showing operation of the note sequence analysis apparatus 100 (processing unit 12) in the sixth embodiment. The process of FIG. 24 is commenced for example when the user instructs start of evaluation of instrumental play. When a designated note sequence SQ is acquired in response to operation of the input unit 18 (SD1), the processing unit 12 (similarity analyzer 22) calculates the similarity index Z[n] based on similarity between the designated note sequence SQ and each reference note sequence SR extracted from each of the plurality of reference pieces of music (SD2). The calculation of the similarity index Z[n] is conducted by method similar to any of the first to fifth embodiments. The processing unit 12 (music selector 24) selects a plurality of candidate pieces of music based on the similarity indices calculated at Step SD2 (SD3). Then, the processing unit 12 functions as the display controller 28 to display the candidate list image on the display unit 16 (SD4), and functions as the music selector 24 to select one reference piece of music as the target piece of music according to instruction of the user from among the plurality of candidate pieces of music (SD5). Further, the processing unit 12 functions as the evaluator 26 to calculate the evaluation index P based on the similarity index Z[n] of the target music piece, and functions as the display controller 28 to display the evaluation resultant image 30 on the display unit 16 as shown in FIG. 4 (SD7).

The sixth embodiment can realize same advantage as that achieved by the first embodiment. Moreover, in the sixth embodiment, one reference piece of music designated by the user is selected from among the plurality of the candidate pieces of music selected based on their similarity indices Z[n]. Consequently, the sixth embodiment can reduce possibility that the evaluation index P is calculated for a wrong reference piece of music which is inadvertently selected as the target piece of music and which is not intended by the user, as compared to the construction in which a reference piece of music having the maximal similarity index Z[n] is automatically selected as the target piece of music.

<Modifications>

Various modifications can be made to each of the above embodiments. The following are specific examples of such modifications. Two or more modifications arbitrarily selected from the following examples may be appropriately combined.

(1) In a configuration in which a reference piece of music having a highest similarity index Z[n] is selected as a target piece of music as in each of the above-described embodiments, one reference piece of music having a highest similarity index Z[n] is selected as a target piece of music even when the designated note sequence SQ is not similar to any reference note sequence SR. Accordingly, when the maximum value of N similarity indices Z[n] calculated for respective reference pieces of music is less than a predetermined threshold value (that is, when the designated note sequence SQ is not similar to any reference note sequence SR), predetermined processes (exceptional processes) described below can be performed.

For example, it is possible to employ a configuration in which the display controller 28 controls the display unit 16 to display a warning message indicating that the designated note sequence SQ is not similar to any reference note sequence SR and a configuration in which the display controller 28 controls the display unit 16 to display a list of N reference pieces of music stored in the storage unit 14 such that the user can select a target piece of music (reference piece of music played by the user) from the list.

When the maximum value of N similarity indices Z[n] is less than the threshold value (e.g. when the user plays a piece of music other than the N reference pieces of music stored in the storage unit 14), the user can search a music server apparatus storing a plurality of reference pieces of music for a target piece of music corresponding to the designated note sequence SQ through the note sequence analysis apparatus 100 (e.g. a communication terminal such as a cellular phone). The music server apparatus searches for the reference piece of music corresponding to the designated note sequence SQ, requested by the note sequence analysis apparatus 100, and displays the title of the reference piece of music, for example, on the display unit 16 of the note sequence analysis apparatus 100. For example, the similarity index Z[n] in the above-described embodiments is preferably used for the music server apparatus to search for the reference piece of music. Furthermore, a configuration in which the music server apparatus informs the note sequence analysis apparatus 100 of the searched reference piece of music to recommend purchase of music data (e.g. MIDI data) to the user is preferable.

(2) The similarity index X[n] is set based on the basic value x[b] (similarity V[k] for each unit period) calculated for every K unit period F and the similarity index Y[n] is set based on the basic value y[b] calculated for every K unit period F in each of the above-described embodiments. In the above-described configuration, when an interval corresponding to K unit periods F (or one unit period F) of a reference piece of music is designated as the designated note sequence SQ, the evaluation index P becomes a large value indicating a highly evaluated state. Accordingly, a configuration in which the evaluation index P is corrected based on the ratio of the note sequence length (e.g. the number of notes or duration) of the designated note sequence SQ to the note sequence length of the reference note sequence SR may be employed. Specifically, the evaluator 26 multiplies the evaluation index P by the ratio LQ/LR of the note sequence length LQ of the designated note sequence SQ to the note sequence length LR (e.g. the number of notes or duration) of the reference note sequence SR. In this configuration, when the user designates only an interval corresponding to 20% of the reference note sequence SR as the designated note sequence SQ (LQ/LR=2/10), the evaluation index P is set to 20% (P=20) of the value (P=100) when the user plays the whole reference note sequence SR. That is, the evaluation index P becomes a large value indicating a highly evaluated state as an interval of the reference note sequence SR, which is correctly played by the user, becomes longer.

(3) While the similarity index X[n] is calculated based on the edit distance E of each unit period F in each of the above-described embodiments, it is possible to employ a configuration in which the edit distance E is calculated by comparing the whole designated note sequence SQ with the reference note sequence SR (configuration in which the edit distance E is calculated without dividing the designated note sequence SQ and the reference note sequence SR into unit periods F). For example, the similarity index X[n] can be calculated by applying the edit distance E to Equation (3). Furthermore, a configuration in which the duration feature T of each unit period F of the designated note sequence SQ is compared with the duration feature T of each unit period F of the reference note sequence SR for the whole designated note sequence SQ and the whole reference note sequence SR is preferably employed. According to this configuration, it is possible to decrease the evaluation index P (that is, to appropriately evaluate the designated note sequence SQ) when the user designates only part of the reference note sequence SR as the designated note sequence SQ.

(4) The similarity index Z[n] (a similarity index Z1[n] for music selection) used for the music selector 24 to select a target piece of music may be different from the similarity index Z[n] (a similarity index Z2[n] for performance evaluation) used for the evaluator 26 to calculate the evaluation index P. Specifically, a configuration in which the weight $W_X$ becomes different from the weight $W_Y$ according to the similarity indices Z1[n] and Z[n] may be employed. For example, on the assumption that arrangement (similarity index X[n]) of notes is emphasized when the target piece of music is selected and arrangement of notes and harmonic sense (the similarity index Y[n]) are emphasized when the performance of the user is evaluated, it is possible to advantageously employ a configuration in which the weight $W_X$ used when the similarity index Z1[n] is calculated is set to a value exceeding the weight $W_X$ used when the similarity index Z2[n] is calculated (configuration in which the similarity index X[n] is regarded as important when a piece of music is selected) and a configuration in which the weight $W_Y$ used when the similarity index Z1[n] is calculated is set to a value smaller than the weight $W_Y$ used when the similarity index Z2[n] is calculated (configuration in which the similarity index Y[n] is regarded as important when a piece of music is selected). Furthermore, it is also possible to employ a configuration in which one of the similarity index X[n] and the similarity index Y[n] is reflected in the similarity index Z1[n] for music selection (one of the weights $W_X$ and $W_Y$ is set to 0) and a configuration in which both the similarity index X[n] and the similarity index Y[n] are reflected in the similarity index Z2[n] for performance evaluation.

(5) While the similarity index Z[n] is calculated from the similarity index Y[n] based on a result of comparison of the similarity index X[n] and the duration feature T according to the edit distance E in each of the above-described embodiments, the method of calculating the similarity index Z[n] is not limited thereto and can be arbitrarily modified. For example, the similarity index Z[n] can be calculated based on the similarity between the designated note sequence SQ and the reference note sequence SR using dynamic time warping (DTW). Furthermore, the similarity index Z[n] may be set according to at least one of the similarity index X[n] based on the edit distance E, the similarity index Y[n] based on the duration feature T and the similarity index U[n] based on the time value feature H. For example, only one of the similarity indices X[n], Y[n] and U[n] can be calculated as the similarity index Z[n], and the similarity index Z[n] can be calculated based on one of the similarity indices X[n] and Y[n], and the similarity index U[n]. In addition, a value (evaluation index P) calculated according to Equations (1A) and (1B) can be determined as the similarity index Z[n].

While the configuration in which the similarity index Z[n] increases as the similarity between the designated note sequence SQ and the reference note sequence SR increases is exemplified in each of the above-described embodiments, the relationship between the similarity between the designated note sequence SQ and the reference note sequence SR and the similarity index Z[n] (similarity index X[n] and similarity index Y[n]) is not limited thereto. For example, the similarity index Z[n] (similarity index X[n] and similarity index Y[n]) of the reference piece of music can be calculated such that the similarity index Z[n] decreases as the similarity between the designated note sequence SQ and the reference note sequence SR increases.

(6) When the user sequentially stores designated note sequences SQ, inputted by manipulating the input unit 16, in the storage unit 14 and selects a desired evaluation indicator 314 in the evaluation transition image 312 by manipulating the input unit 18, a designated note sequence SQ corresponding to the evaluation indicator 314 can be acquired from the storage unit 14 and sound can be reproduced through a sound output device. According to this configuration, it is possible to acoustically recognize the present performance by hearing each designated note sequence SQ of the past.

(7) While the similarity index Z[n] is converted into the evaluation index P according to Equation (1A) or (1B) in each of the above-described embodiments, the method of specifying the evaluation index P based on the similarity index Z[n] is arbitrary. For example, the similarity index Z[n] can be designated as the evaluation index P. As is understood from the above description, the evaluator 26 in each of the above-described embodiments is included in the note sequence analysis apparatus as an element for specifying the evaluation index P based on the similarity index Z[n] irrespective of whether the similarity index Z[n] is converted or not (whether the similarity index Z[n] is different from the evaluation index P).

(8) While the similarity index Z[n] is calculated through a method common for all reference pieces of music in each of the above-described embodiments, different methods may be respectively employed to calculate the similarity index Z[n] for groups obtained by dividing N reference pieces of music. Specifically, the N reference pieces of music can be divided into a plurality of groups according to genre and the similarity index Z[n] of each reference piece of music can be weighted with a weight independently set for each group. The similarity analyzer 22 (index calculator 48) multiplies the similarity index Z[n] of a first reference piece of music belonging to a first group by a weight ω1 and multiplies the similarity index Z[n] of a second reference piece of music belonging to a second group by a weight ω2. For example, a weight for the similarity index Z[n] of each reference piece of music of a genre designated by the user through the input unit 18 is set to a value greater than a weight for the similarity index Z[n] of a reference piece of music of a different genre. According to this configuration, the possibility that a reference piece of music is selected as a target piece of music can be different for respective groups (genres of reference pieces of music).

(9) While the tolerance period α[m1] containing one note v[m1] and the same number of notes before and after the note v[m1] is illustrated in the second and fourth embodiments, the method of setting the tolerance period α[m1] may be appropriately modified. For example, it is possible to employ a configuration in which a time series of a predetermined number of notes having the note v[m1] disposed at the end is set to the tolerance period α[m1] and a configuration in which a time series of a predetermined number of notes having the note v[m1] disposed at the head is set to the tolerance period α[m1]. In addition, the number of notes disposed before the note v[m1] and the number of notes following the note v[m1] in the tolerance period α[m1] may be different from each other. Furthermore, while the tolerance period α[m1] set to the designated note sequence SQ is illustrated in the above description, the same modification may be applied to the tolerance period α[m2] set to the reference note sequence SR in the third and fourth embodiments.

(10) While the element values t[1] to t[12] are calculated for 12 pitch classes respectively corresponding to 12 semitones in each of the above-described embodiments, the number of pitch classes (the number of element values t[c] constituting the duration feature T) and a pitch class classification method may be appropriately modified. For example, the number of pitch classes may be set to a value which exceeds 12 (e.g. 24, 36 or 48) or set to a value less than 12. The number of pitch classes may be set in consideration of tune, for example. Furthermore, pitch classes may be set for each range. For example, 12 pitch classes respectively corresponding to 12 semitones belonging to each odd-numbered octave from among a plurality of octaves and 12 pitch classes respectively corresponding to 12 semitones belonging to each even-numbered octave may be individually set (and thus a total of 24 element values t[c] is calculated for each unit period F). In addition, 12 pitch classes respectively corresponding to 12 semitones in a register (e.g. register of measured sound) higher than a predetermined threshold value and 12 pitch classes respectively corresponding to 12 semitones in a register (e.g. register of accompaniment) lower than the threshold value may be independently set (and thus a total of 24 element values t[c] is calculated for each unit period F). As is understood from the above description, a pitch class refers to a range (classification) including at least two pitches in the same pitch name and the number of pitch classes and pitch classification method are contrivable. In addition, the method of calculating the element value [c] of the duration feature T is not limited to the above-described example. For example, in the configuration in which the cosine distance (angle between vectors) between the duration feature TQ and the duration feature TR is calculated as described above, the sum τa of durations of notes belonging to a c-th pitch class from among a plurality of notes in a unit period F can be used as the element value t[c] (that is, the ratio of the sum τa of durations of notes belonging to the c-th pitch class to the sum τb of durations of all notes in the unit period F is not calculated).

(11) While the time value feature H (HR and HQ) including element values h[1] to h[8] respectively corresponding to 8 time values is exemplified in the fifth embodiment, the type and number of time values reflected in the time value feature H are contrivable. For example, a 4-dimensional vector having element values h[1] to h[4] respectively corresponding to a whole note, half note, quarter note and eighth note can be calculated as the time value feature H. The method of calculating each element value h[d] of the time value feature H is not limited to the above example. For example, in the configuration in which the cosine distance (angle between vectors) between the time value feature HR and the time value feature HQ is calculated as described above, the number μa of notes classified as a d-th time value from among a plurality of notes in the unit period F can be used as the element value h[d] (that is, the ratio of the number μa of notes classified as the d-th time value to the number μb of all notes in the unit period F is not calculated). Furthermore, the method of calculating the similarity index U[n] is not limited to the above embodiments. For example, the time value feature H corresponding to the whole note sequence (reference note sequence SR and designated note sequence SQ) can be calculated by counting the number of notes corresponding to each time value in the whole note sequence (the time value feature H corresponding to each unit period F is not independently calculated). The third analyzer 54 calculates a distance (e.g. cosine distance) between a time value feature HR corresponding to the whole reference note sequence SR and a time value feature HQ corresponding to the whole designated note sequence SQ as the similarity index U[n]. That is, calculation of each basic value u[b] is omitted. In addition, the similarity index U[n] may be calculated by comparing the average of time value features HR of unit periods F of the reference note sequence SR and the average of time value features HQ of unit periods F of the designated note sequence SQ (by calculating the distance).

(12) The note sequence analysis apparatus 100 can be implemented as a server device communicating with a terminal such as a cellular phone, personal computer, etc. That is, the note sequence analysis apparatus 100 receives the designated note sequence SQ designated by the user through the input unit 18 of a terminal, analyzes a correlation between the designated note sequence SQ and each reference note sequence SR and displays the analysis result on the display unit 16 of the terminal. As is understood from the above description, the input unit 18 and the display unit 16 in the above-described embodiments can be omitted from the note sequence analysis apparatus 100.

(13) A feature for evaluating a similarity between note sequences is not limited to the above-described duration feature T and the time value feature H. For example, a chroma vector (pitch class profile) composed of values which are obtained by adding intensities (volumes) of notes to each pitch class and arranged for a plurality of pitch classes can be used to evaluate a similarity between note sequences. However, since the duration (time value) of each note is not reflected in the chroma vector, the chroma vector may not be suitable as a feature for evaluating similarity between note sequences. If the duration feature T and the time value feature H described in each of the above-described embodiments are used, similarity between note sequences can be appropriately evaluated from the viewpoint of the duration (time value) of each note.

As is understood from the above description, the duration feature T and the time value feature H can be effectively used alone as a feature of a note sequence. Accordingly, the configuration in which the duration feature T is calculated and the configuration in which the time value feature H is calculated in the above-described embodiments can be respectively accomplished as inventions (without requiring evaluation of similarity between note sequences and search of a reference piece of music). Specifically, a note sequence analysis apparatus including an element (e.g. the feature calculator 44 of each of the above-described embodiments) for calculating the duration feature from a note sequence and a note sequence analysis apparatus including an element (e.g. the feature calculator 52 of the fifth embodiment) for calculating the time value feature H from a note sequence can be implemented as independent inventions.

What is claimed is:

1. A note sequence analysis apparatus comprising:
one or more processors programmed to:
calculate a similarity index based on similarity between a designated sequence of notes designated by a user and a reference sequence of notes for each of a plurality of reference pieces of music;
select a reference piece of music from among the plurality of reference pieces of music based on the similarity index calculated for each of the plurality of reference pieces of music;
specify an evaluation index of the designated sequence of notes based on the similarity index calculated for the selected reference piece of music; and
output the specified evaluation index of the designated sequence of notes to a display.

2. The note sequence analysis apparatus according to claim 1, wherein the similarity index is calculated based on an edit distance between the designated sequence of notes and the reference sequence of notes.

3. The note sequence analysis apparatus according to claim 2, wherein the edit distance is calculated by setting a substitution cost between a first note in the designated sequence of notes and a second note in the reference sequence of notes to a first value when at least one of the first and second notes corresponds to any of a plurality of notes within a tolerance period including the other of the first and second notes and by setting the substitution cost to a second value different from the first value when each one of the first and second notes does not correspond to any of the plurality of notes in the tolerance period.

4. The note sequence analysis apparatus according to claim 1, wherein the similarity index is calculated based on a result of comparison between a duration feature of the designated sequence of notes for each unit period thereof and a duration feature of the reference sequence of notes for each unit period thereof, the duration feature being obtained by arranging a plurality of element values corresponding to a plurality of pitch classes within the unit period, each element value corresponding to a sum of durations of notes belonging to each pitch class.

5. The note sequence analysis apparatus according to claim 1, wherein the similarity index is calculated based on a result of comparison of a time value feature of the designated sequence of notes for each unit period thereof and a time value feature of the reference sequence of notes for each unit period thereof, the time value feature being obtained by arranging a plurality of element values corresponding to a plurality of time values within the unit period, each element value corresponding to a number of notes belonging to each time value.

6. The note sequence analysis apparatus according to claim 1, wherein the similarity index is calculated based on similarity between an entire length of the reference sequence of notes and an entire length of the designated sequence of notes.

7. The note sequence analysis apparatus according to claim 1, wherein the one or more processors are programmed to:
calculate a basic value based on similarity between the designated sequence of notes and the reference sequence of notes for each of a plurality of cases in which a position of the designated sequence of notes is changed in a time domain relative to the reference sequence of notes; and
calculate the similarity index based on a plurality of the basic values calculated for the plurality of the cases.

8. The note sequence analysis apparatus according to claim 1, wherein the one or more processors are programmed to correct the similarity index of the selected reference piece of music based on a ratio between a length of the designated sequence of notes and a length of the reference sequence of notes of the selected reference piece of music.

9. The note sequence analysis apparatus according to claim 1, wherein the one or more processors are programmed to:
successively perform, each time a designated sequence of notes is inputted by the user, a routine of calculating the similarity index, selecting the reference piece of music and specifying the evaluation index, thereby generating a time series of the evaluation indices for the designated sequences of notes; and
control a display device to display an evaluation transition image representing the time series of the evaluation indices corresponding to the designated sequences of notes.

10. The note sequence analysis apparatus according to claim 1, wherein the one or more processors are programmed to control a display device to display warning that the designated sequence of notes is not similar to any of reference sequences of notes when the similarity index calculated for each reference piece of music fails to clear a threshold value.

11. The note sequence analysis apparatus according to claim 1, wherein the one or more processors are programmed to:
select two or more of reference pieces of music based on the similarity index calculated for each of the plurality of reference pieces of music; and
select one reference piece of music from among the selected two or more of reference pieces of music according to instruction of the user.

12. A note sequence analysis method comprising the steps of:
calculating, by a processor, a similarity index based on similarity between a designated sequence of notes designated by a user and a reference sequence of notes for each of a plurality of reference pieces of music;
selecting, by the processor, a reference piece of music from among the plurality of reference pieces of music based on the similarity index calculated for each of the plurality of reference pieces of music;
specifying, by the processor, an evaluation index of the designated sequence of notes based on the similarity index calculated for the selected reference piece of music; and
outputting, by the processor, the specified evaluation index of the designated sequence of notes to a display.

13. The note sequence analysis method according to claim 12, wherein the step of calculating calculates the similarity index based on an edit distance between the designated sequence of notes and the reference sequence of notes.

14. The note sequence analysis method according to claim 13, wherein the step of calculating calculates the edit distance by setting a substitution cost between a first note in the designated sequence of notes and a second note in the reference sequence of notes to a first value when one of the first and second notes corresponds to any of a plurality of notes within a tolerance period including the other of the first and second notes, and by setting the substitution cost to a second value different from the first value when one of the first and second notes does not correspond to any of the plurality of notes in the tolerance period.

15. The note sequence analysis method according to claim 12, wherein the step of calculating calculates the similarity index based on a result of comparison between a duration feature of the designated sequence of notes for each unit period thereof and a duration feature of the reference sequence of notes for each unit period thereof, the duration feature being obtained by arranging a plurality of element values corresponding to a plurality of pitch classes within the unit period, each element value corresponding to a sum of durations of notes belonging to each pitch class.

16. The note sequence analysis method according to claim 12, wherein the step of calculating calculates the similarity index based on a result of comparison of a time value feature of the designated sequence of notes for each unit period thereof and a time value feature of the reference sequence of notes for each unit period thereof, the time value feature being obtained by arranging a plurality of element values corresponding to a plurality of time values within the unit period, each element value corresponding to a number of notes belonging to each time value.

17. The note sequence analysis method according to claim 12, wherein the step of calculating calculates the similarity index based on similarity between an entire length of the reference sequence of notes and an entire length of the designated sequence of notes.

18. The note sequence analysis method according to claim 12, wherein the step of calculating comprises:
  calculating, by the processor, a basic value based on similarity between the designated sequence of notes and the reference sequence of notes for each of a plurality of cases in which a position of the designated sequence of notes is changed in a time domain relative to the reference sequence of notes; and
  calculating, by the processor, the similarity index based on a plurality of the basic values calculated for the plurality of the cases.

19. The note sequence analysis method according to claim 12, further comprising the step of correcting, by the processor, the similarity index of the selected reference piece of music based on a ratio between a length of the designated sequence of notes and a length of the reference sequence of notes of the selected reference piece of music.

20. The note sequence analysis method according to claim 12, further comprising the steps of:
  successively performing, by the processor, each time a designated sequence of notes is inputted by the user, a routine of calculating the similarity index, selecting the reference piece of music and specifying the evaluation index, thereby generating a time series of the evaluation indices for the designated sequences of notes; and
  controlling, by the processor, a display device to display an evaluation transition image representing the time series of the evaluation indices corresponding to the designated sequences of notes.

21. The note sequence analysis method according to claim 12, further comprising the step of controlling, by the processor, a display device to display warning that the designated sequence of notes is not similar to any of reference sequences of notes when the similarity index calculated for each reference piece of music fails to clear a threshold value.

22. The note sequence analysis method according to claim 12, wherein the step of selecting comprises the steps of:
  selecting, by the processor, two or more of reference pieces of music based on the similarity index calculated for each of the plurality of reference pieces of music; and
  selecting, by the processor, one reference piece of music from among the selected two or more of reference pieces of music according to instruction of the user.

* * * * *